US008413790B2

(12) United States Patent
Nilsson

(10) Patent No.: US 8,413,790 B2
(45) Date of Patent: Apr. 9, 2013

(54) METHOD AND ARRANGEMENT FOR TRANSFERRING PACKAGING CONTAINERS FROM A FIRST UNIT TO A SECOND UNIT

(75) Inventor: Jan Nilsson, Kalmar (SE)

(73) Assignee: Norden Machinery AB (SE)

( * ) Notice: Subject to any disclaimer, the term of this patent is extended or adjusted under 35 U.S.C. 154(b) by 0 days.

(21) Appl. No.: 12/988,795

(22) PCT Filed: Apr. 23, 2009

(86) PCT No.: PCT/SE2009/000211
§ 371 (c)(1),
(2), (4) Date: Feb. 14, 2011

(87) PCT Pub. No.: WO2009/131519
PCT Pub. Date: Oct. 29, 2009

(65) Prior Publication Data
US 2011/0150619 A1    Jun. 23, 2011

(30) Foreign Application Priority Data
Apr. 23, 2008   (SE) ...................................... 0800934

(51) Int. Cl.
*B65B 35/38*   (2006.01)
*B65B 35/58*   (2006.01)
*B65G 47/53*   (2006.01)
*B65G 47/90*   (2006.01)

(52) U.S. Cl. ...................... 198/430; 198/409; 198/468.4; 414/226.01; 414/738; 414/800; 53/473; 53/251; 53/567

(58) Field of Classification Search .................. 198/409, 198/429, 430, 468.2, 468.4; 414/226.01, 414/738, 740, 800; 53/473, 251, 567
See application file for complete search history.

(56) References Cited

U.S. PATENT DOCUMENTS

| 4,901,504 A | 2/1990 | Tsuji et al. |
| 5,257,888 A * | 11/1993 | Kronseder ............... 414/416.06 |
| 5,471,738 A * | 12/1995 | Burcham et al. ................ 29/701 |
| 5,611,193 A | 3/1997 | Farrelly |
| 5,655,355 A | 8/1997 | Ramler |
| 5,934,859 A * | 8/1999 | Goetzelmann ........... 414/416.08 |
| 6,141,943 A * | 11/2000 | Hart et al. ....................... 53/444 |
| 6,210,093 B1 * | 4/2001 | Hannen et al. ........... 414/226.01 |
| 6,733,224 B1 * | 5/2004 | Linner ..................... 414/416.02 |

FOREIGN PATENT DOCUMENTS
WO    WO 0069724 A1    11/2000

* cited by examiner

*Primary Examiner* — Mark A Deuble
(74) *Attorney, Agent, or Firm* — Schwegman Lundberg & Woessner, P.A.

(57) ABSTRACT

The invention relates to a method for synchronizing, and a transfer device for synchronizing, a movement pattern between two units in a packaging line, wherein one unit is intermittently operated and the second unit is continuously operated. The invention is particularly intended for a transfer device between an intermittently operated filler unit and a continuously operated cartoning machine. The transfer device is provided with a frame (13) arranged to support tube pickers-/placers (28) and is arranged to perform a simultaneous pivoting movement about a first and a second shaft (16, 31), and for rotation about a third shaft (48) at right angles to the second shaft (31). The frame is further provided with means for adjusting the spacing between the tubes and means for compensating for differences in vertical position during the rotating movement in the case where the containers picked from the part circular conveyor of the filling unit.

19 Claims, 20 Drawing Sheets

METHOD AND ARRANGEMENT FOR TRANSFERRING PACKAGING CONTAINERS FROM A FIRST UNIT TO A SECOND UNIT

FIELD OF THE INVENTION

The invention relates to a method and an arrangement for transferring packaging containers, in particular packaging tubes, from a first unit operating intermittently in a first horizontal path to a second unit operating continuously in a second horizontal path.

The invention relates in particular to a method and arrangement for transferring filled tubes from a tube filler, operating in a horizontal circular path and provided with a plurality of filling nozzles, to a continuously operating cartoning machine.

PRIOR ART

It has for many years been known to handle packaging containers, and in particular packaging tubes, using the so-called pick-and-place principle. This principle is used, for example, for collecting packaging tubes downstream of a filler, and the principle is applied in such a way that the tubes, downstream of the filler, are placed in a so-called stepped conveyor", i.e. a belt provided with a number of cases.

To be able to handle a continuously operating conveyor belt with these cases, some form of transfer arrangement is needed which can handle the transition between intermittent feeding of packaging containers and continuous feeding.

A method for doing this is the so-called drop-flap principle. In this, a flap device is inserted between a conveyor belt serving as buffer belt, in which packaging containers are continuously fed with a predetermined spacing between them, and a continuously operating conveyor belt provided with "cases". To be able to drop the packaging containers into the associated cases on the continuously driven belt, precise control of the flaps is required so that these are opened at the correct moment and a tube falls into the correct case. This method is relatively common, but it has the inherent disadvantage that one has to rely on gravity, and in addition to this the arrangement is such that friction always remains an uncertain factor.

Another principle is based on a "rotating drum". A drum provided with suitable recesses corresponding to the container shape is in this case inserted between a delivery conveyor, on which tubes are advanced with a predetermined spacing between them, and a "case conveyor". The conveyor provided with cases is arranged under this drum, and the speed of rotation of the rotating drum is adapted in such a way that as soon as one of the recesses is situated over a case, a packaging container drops into the case.

The trend in the area of packaging machines is moving towards increasing production capacities and consequently towards higher speeds. A specific problem in this context is the insufficiency of existing transfer devices, e.g. of the above types where, for instance during the transfer phase from one unit to another, for example from filler to cartoning machine, there is insufficient control of the packaging container. The principle of gravity is of course useful during placement in a respective case, but problems may occur during the transfer phase itself because the packaging containers are not continuously and positively gripped. It is also desired to achieve a higher production capacity without increasing the number of staff, which places a demand for flexible production lines.

WO 2000/69724 shows a solution where a transfer device allows for a relatively high production speed while maintaining control of the packaging container. This will therefore solve the problem of controlling the said containers at relatively high speeds, but requires the delivery conveyor to be located in a particular position relative to the transfer conveyor. This is a disadvantage that limits the flexibility of the installation.

The object of the invention is therefore to make available a solution in which this disadvantage is eliminated, and which solution can be generally applied for synchronizing the transfer of packaging containers from one movement path to another with complete control, and gripping of the containers throughout the entire transfer phase.

THE INVENTION

The object of the invention is achieved by means of a method and an arrangement as specified in the attached claims 1 and 19, respectively.

According to a preferred embodiment the invention relates to a method for transferring packaging containers from a first conveyor operating in a substantially horizontal path to a second conveyor operating in a substantially horizontal path. The first conveyor may comprise a continuously or intermittently operating first unit. The second conveyor may comprise a continuously or intermittently operating second unit, or alternatively a stationary unit in the form of a weighing unit. In the subsequent text the term "continuous" is used to define an operation carried out at a fixed or variable speed, while the term "intermittent" relates to a displacement involving a step-wise movement. The term "stationary unit" relates to units other than conveyors, for instance, a unit or station to which articles are transferred in a predetermined number or until a predetermined weight is reached.

A number of container pickers/placers may be arranged on a frame that can pivot about a first horizontal axis from a container pick-up position to a container release position and back to the container pick-up position. In a first step the frame with the container pickers/placers are caused to grip a number of containers in the horizontal conveyor of the first unit. Said container pickers/placers may be arranged to be pivoted in said frame about a second horizontal axis, parallel with the first axis. During its pivoting movement to the container release position the container picker/placer can be made to perform a rotating movement about a third axis, at right angles to and rotatable about the second axis.

According to a first alternative embodiment of the invention, the first and the second conveyors are placed with their main directions of transport substantially parallel to the first horizontal axis of the frame. The speeds of the respective first and second conveyors may be constant or variable for a continuously operated conveyor. The speed may also be zero, for an intermittently operated conveyor or a stationary weighing unit. The first embodiment may be used, for instance, for a pair of conveyors being operated in opposite directions. In order to pick and place articles from and to, respectively, a continuously operating conveyor, the frame can be made to perform an accelerating movement about a fourth, vertical axis during its rotating movement to the container release position. The acceleration can be performed in such a way that the speed of the container pickers/placers in the pick-up and the release positions, respectively, corresponds to the speed of the actual unit. A method of this kind may for instance be used in an arrangement where articles, such as e.g. filled containers, tubes or similar, are to be transferred from a first conveyor in the form of an intermittently operating filling line to a second conveyor in the form of a continuously operated conveyor moving the tubes to a cartoning machine.

After being transferred to the filling line the tubes will be filled and sealed, and be moved to a transfer unit according to the invention. The tubes will thereby be transferred from the intermittently operated filling line to a continuously operated, straight conveyor comprising a cartoning machine.

The first and the second conveyors mar be placed may be placed at least substantially parallel to each other adjacent the transfer unit. For instance, both the first and the second conveyors may comprise straight conveyors being operated in the same or in opposite directions. Alternatively one or both conveyors may be part circular, wherein tangents to the respective conveyor being arranged in parallel adjacent the transfer unit.

The invention allows the articles to be transferred from the first to the second conveyor while being simultaneously rotated about said third axis. Hence the articles may arrive at the transfer unit on the first conveyor placed at a first angle, but be delivered to the second conveyor at a second angle. The articles may, for instance, be delivered to the second conveyor at the same angle as they left the first conveyor, rotated 180° relative to their position on the first conveyor, or alternately in the same and in the rotated position.

According to a second alternative embodiment of the invention, one conveyor is placed with its main direction of transport arranged substantially parallel with the first horizontal axis of the frame, while the second is arranged substantially at right angles to the first horizontal axis of the frame. The speed of the respective first and second units may be constant or variable, in the case of a continuously operating conveyor. The speed may also be zero during pick-up of containers, for an intermittently operated conveyor or for a stationary weighing unit. The first embodiment may for instance be used for a pair of conveyors operating in opposite directions.

Such a method may for instance be used in an arrangement as described above, where articles such as filled tubes or similar are to be transferred from a first conveyor in the form of an intermittently operated filling line to a second conveyor in the form of an intermittently or a continuously operated conveyor that moves the tubes to a cartoning machine.

In connection with the transfer unit the first and the second conveyor may be placed at least substantially at right angles to each other. For example, both the first and the second conveyor may be straight conveyors driven in the same or in opposite directions. Alternatively, one or both conveyors may be part circular wherein tangents to the respective conveyor being arranged in parallel adjacent the transfer unit. The invention allows the articles to be transferred from the first to the second conveyor while being simultaneously rotated about said third axis. As described above, the articles may arrive at the transfer unit on the first conveyor placed at a first angle, but be delivered to the second conveyor at a second angle. The articles may, for instance, be delivered to the second conveyor at the same angle as they left the first conveyor, alternatively rotated +/−90° or 180° relative to their position on the first conveyor, or alternately in a desired rotated position.

A common feature of the above embodiments is that the method may comprise additional method steps, wherein the container pickers/placers are displaced to a mutual distance corresponding to the mutual distance between containers, or the partition, of the second unit during the said rotating movement of the frame to the container release position.

In cases where the first conveyor comprises a part circular portion and the articles, for instance tubes, to be pick from this conveyor are to be rotated from a standing to a lying down position, differences in height will result during the said rotating movement. The method according to the invention allows for a compensation of the differences in height between the containers picked from the part circular conveyor and resulting from the rotating movement.

If the containers are vertically oriented in a first, intermittently operated conveyor, the rotating movement about the second axis in combination with the rotating movement about the first horizontal axis can be performed so that the containers arrive horizontally to the second conveyor. Correspondingly, differences in mutual position may be compensated for as the articles are transferred between two horizontally operated conveyors, where a first conveyor is part circular and a second conveyor is straight.

The container pickers/placers may be provided with holding devices adapted for the shape, weight and surface structure of the containers. Examples of such holding devices are pneumatic devices for holding the containers using vacuum, or pneumatically, hydraulically or electrically operated grippers.

According to one version of the second alternative embodiment, the invention relates to a method for transferring filled containers from a horizontal, at least partially part circularly operated conveyor having container filler with multiple filling nozzles, to a continuously operated cartoning machine. Multiple container pickers/placers can be arranged on the frame that is rotatable about the horizontal axis from a container pick-up position to a container release position and back to the container pick-up position. Subsequently the frame provided with container pickers/placers may be arranged to grip a number of filled containers in the at least part circular conveyor of the container filler.

During its rotating movement to the container release position the frame can be made to perform an accelerating movement about the vertical axis. The acceleration is performed in such a way that the speed of the container pickers/placers corresponds to the speed of the cartoning machine in the release position. During the said rotating movement of the frame up to the release position the container pickers/placers can be displaced into a mutual distance corresponding to the partition of the cartoning machine. At the same time the differences in height between the containers picked from the part circular conveyor and resulting from the rotating movement can be compensated for. In particular, rotating movement about the second horizontal axis can be combined with the rotating movement about the first horizontal axis, so that the containers arrive horizontally to the cartoning machine. The containers may be held in a positive grip by the said container pickers/placers during the entire rotating movement of the frame.

During a first phase of its rotating movement the frame may rotate to an intermediate position. During this first phase of the movement the frame may be rotated a predetermined angle about the vertical axis. During a subsequent second phase of the rotating movement, up to the container release position, the frame may be made to perform the said accelerating movement during a rotating movement in the opposite direction to the first rotating movement but over the same angle.

After releasing the filled containers to the cartoning machine the frame can be made to perform a reversed movement pattern, in relation to the movement pattern towards the release position. This movement pattern may include retardation of the rotating movement about the vertical axis, returning the frame to its initial position relative to the vertical axis, and returning the container pickers/placers to their initial position.

According to one version of the second alternative embodiment, the invention relates to a similar method for transferring filled containers from a horizontal, at least partially part circularly operated conveyor having container filler with multiple filling nozzles, to a continuously operated cartoning machine. In the same way as in the above embodiment, multiple container pickers/placers can be arranged on the frame that is rotatable about the horizontal axis from a container pick-up position to a container release position and back to the container pick-up position. Subsequently the frame provided with container pickers/placers may be arranged to grip a number of filled containers in the at least part circular conveyor of the container filler.

During the said rotating movement to the container release position, the container pickers/placers may be displaced to a mutual distance corresponding to the partition of the cartoning machine. Also, the differences in height between the containers picked from the part circular conveyor and resulting from the rotating movement may be compensated for. The rotating movement about the second horizontal axis in combination with the rotating movement about the first horizontal axis can preferably be performed so that the containers arrive horizontally to the cartoning machine. During the entire rotating movement of the frame up to the release position, the containers may be held in a positive grip by the said container pickers/placers.

During these phases of movement the Container pickers/placers may be rotated a predetermined angle about said third axis, for the purpose of positioning the containers relative to the cartoning machine. Such an arrangement is preferably, but not necessarily, used when the rotating movement of the container pickers/placers is mechanically connected to the movement of the frame. The angle of rotation about the said third axis is preferably, but not necessarily, +/−90° relative to the initial position of the containers.

The horizontal axle controlling the movement of the frame may be driven in a number of different ways. The drive can be performed by a reciprocation movement and may be achieved by different linkage systems combined with a hydraulic or electrical device. A suitable mechanism of this type may be connected to a lever arm at either end of the first horizontal axle.

In this way, the speed of the containers may be synchronized with the speed of the continuously operated conveyor. When the containers reach the release position their speed is zero or near zero, whereafter the containers are released from the container pickers/placers and are placed in the correct position in the cartoning machine. After releasing the filled containers, the frame can be made to perform an at least partially reversed movement pattern, in relation to the movement pattern towards the release position. This may include returning the frame to its initial position relative to the horizontal axes, and returning the container pickers/placers to their initial position.

In connection with the return movement of the container picker/placer it can be made to perform a rotating movement about the third axis in a first direction from the container pick-up position to the container release position. Hence the container picker/placer can be made to return to the container pick-up position against the first direction or, alternatively, be made to continue to the container pick-up position in the first direction.

In this way, the container picker/placer will perform a rotating movement about the third axis over a predetermined angle from the container pick-up position to the container release position. The predetermined angle may be selected as high as 180°, but is preferably selected up to 90°. The angle of rotation of the containers is selected depending on the position of the transfer device relative to the continuously operated conveyor and/or the desired relative position between the containers and the cartoning machine.

The container picker/placer has its greatest moment of inertia when it is moving filled containers from the container pick-up position to the container release position. It is therefore desirable that the maximum rotating movement of the container picker/placer does not exceed 180° between these positions. This will entail lower power consumption for the transfer device, that the transfer speed (containers/minute) may be increased, and/or that the loading of the components making up the device may be reduced.

The invention further relates to an arrangement for carrying out the method. According to a preferred embodiment the relates to a transfer device for transferring filled containers from a horizontal, intermittently operated conveyor having container filler with multiple filling nozzles, to a continuously operated conveyor. The device comprises a frame rotatable about a first horizontal axis mounted on a stand outside the conveyor of the filling device, and a container picker/placer rotatably mounted in the frame. The transfer device further comprises a device for performing a rotation of the frame about said first axis, from a pick-up position to a release position, and back to the pick-up position. The transfer device also comprises a device for performing a rotation of the said container picker/placer relative said frame about a horizontal second axis, parallel to the first axis. A further device is arranged to perform a rotation of the container picker/placer about a third axis, at right angles to the second axis, during its rotating movement to the container release position. The device for rotating the container picker/placer about the third axis may comprise a controlled electrical or hydraulic drive unit. Alternatively, the device may be mechanically coupled to the device performing the rotating movement of the frame about the first or the second horizontal axis.

A transfer device for use in accordance with the first alternative embodiment comprises a device for rotating the frame about a vertical axis in order to provide an acceleration distance for the said container pickers/placers during the rotation of the frame to the container release position. An additional device triggers and controls the acceleration over the said acceleration distance, so that the container pickers/placers are synchronized with the continuously operated conveyor. According to one example, the intermittently operated conveyor may be an at least part circular conveyor.

The transfer device may further comprise means for displacing the container pickers/placers to a mutual distance corresponding to the partition of the cartoning machine during the rotating movement of the frame up to the container release position. In a case where the device is intended for handling three containers, said device is provided with means for compensating for differences in vertical position between the containers picked from the filling unit. Differences in vertical position can arise when containers are picked from a part circular conveyor and are made to perform a rotating movement about the second horizontal axis. A correction of the differences in vertical position has the effect that a set of containers may be placed in a straight line when released to the cartoning machine.

A transfer device for use in accordance with the second alternative embodiment comprises a device for rotating the frame about a vertical axis so that the container pickers/placers are synchronized with the continuously operated conveyor. Here, the intermittently operated conveyor may also be an at least part circular conveyor.

The transfer device may also comprise means for displacing the container pickers/placers to a mutual distance corresponding to the partition of the cartoning machine during the rotating movement of the frame up to the container release position. In a case where the device is intended for handling three containers, said device is provided with means for compensating for differences in vertical position between the containers picked from the filling unit. Differences in vertical position can arise when containers are picked from a part circular conveyor and are made to perform a rotating movement about the second horizontal axis. A correction of the differences in vertical position has the effect that a set of containers may be placed in a straight line when released to the cartoning machine.

A common feature for the devices described above is that the container pickers/placers may be arranged to be rotated a predetermined angle about the third axis, from the container pick-up position to the container release position. Depending on the desired position of the container on the continuously operated conveyor the container pickers/placers may be arranged to be rotated in an optional direction relative to the initial position where the containers are picked up. The predetermined angle may be up to 180°, but is preferably no more than 90°. The reason for this is dependent on a number of factors, as stated above. The invention is not limited to containers of any particular type or shape. An example of a suitable field of use is the transfer of containers in the form of tubes between two conveyors.

DESCRIPTION OF THE DRAWINGS

The invention will now be described in detail with reference to the appended drawing figures. It is understood that the drawing figures are only illustrations and are not intended to define the scope of the invention, which is defined by the claims appended below. It is further understood that the drawing figures are not necessarily drawn to scale, and that, unless otherwise indicated, the drawing figures only show schematic illustrations of constructions and methods described herein.

PREFERRED EMBODIMENTS

Figure 1:
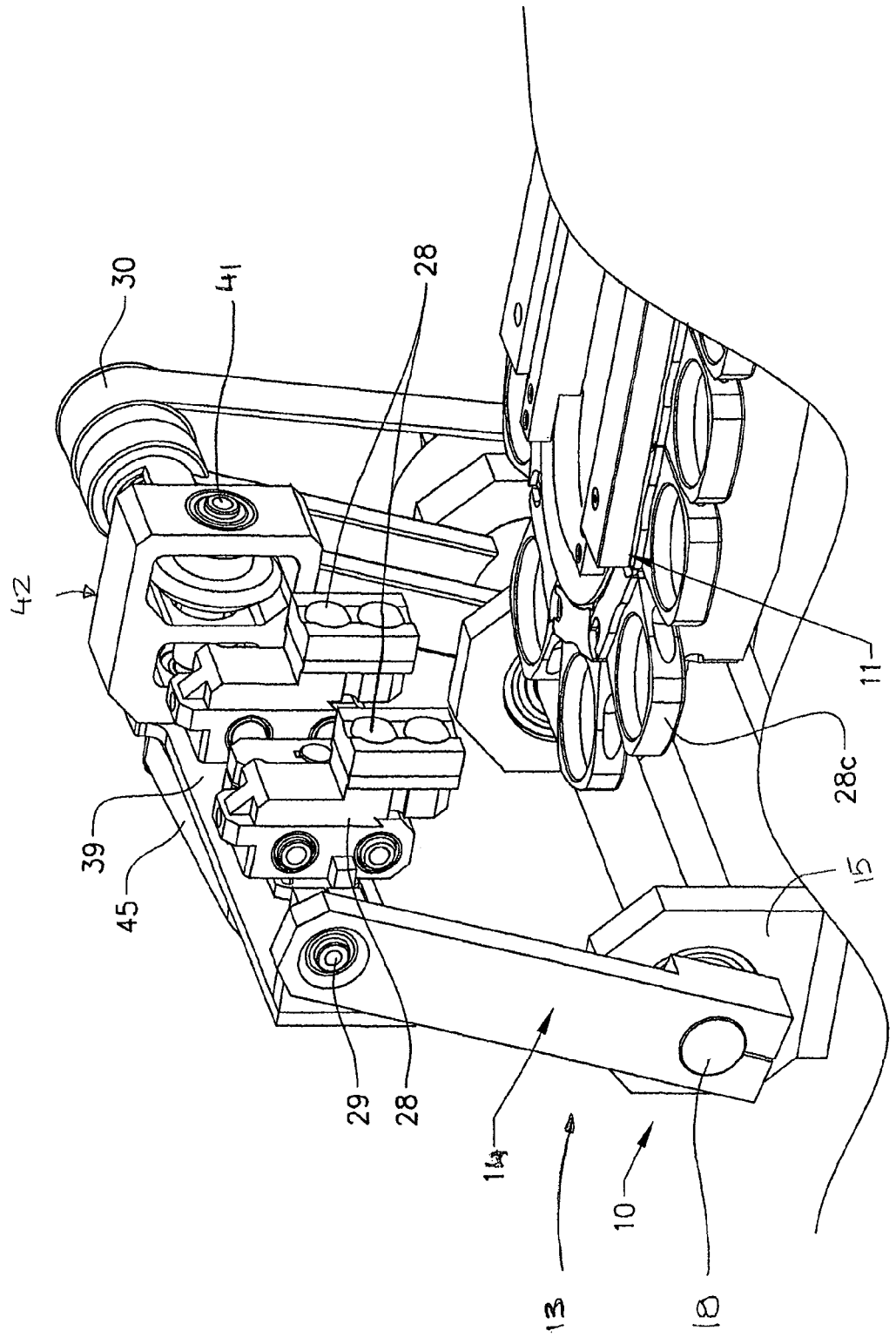
FIG. 1 shows a perspective view, from one end wall, of a transfer device according to a first embodiment of the invention in a position for picking up tubes (not shown) from an intermittently operated filling device.
Figure 2:
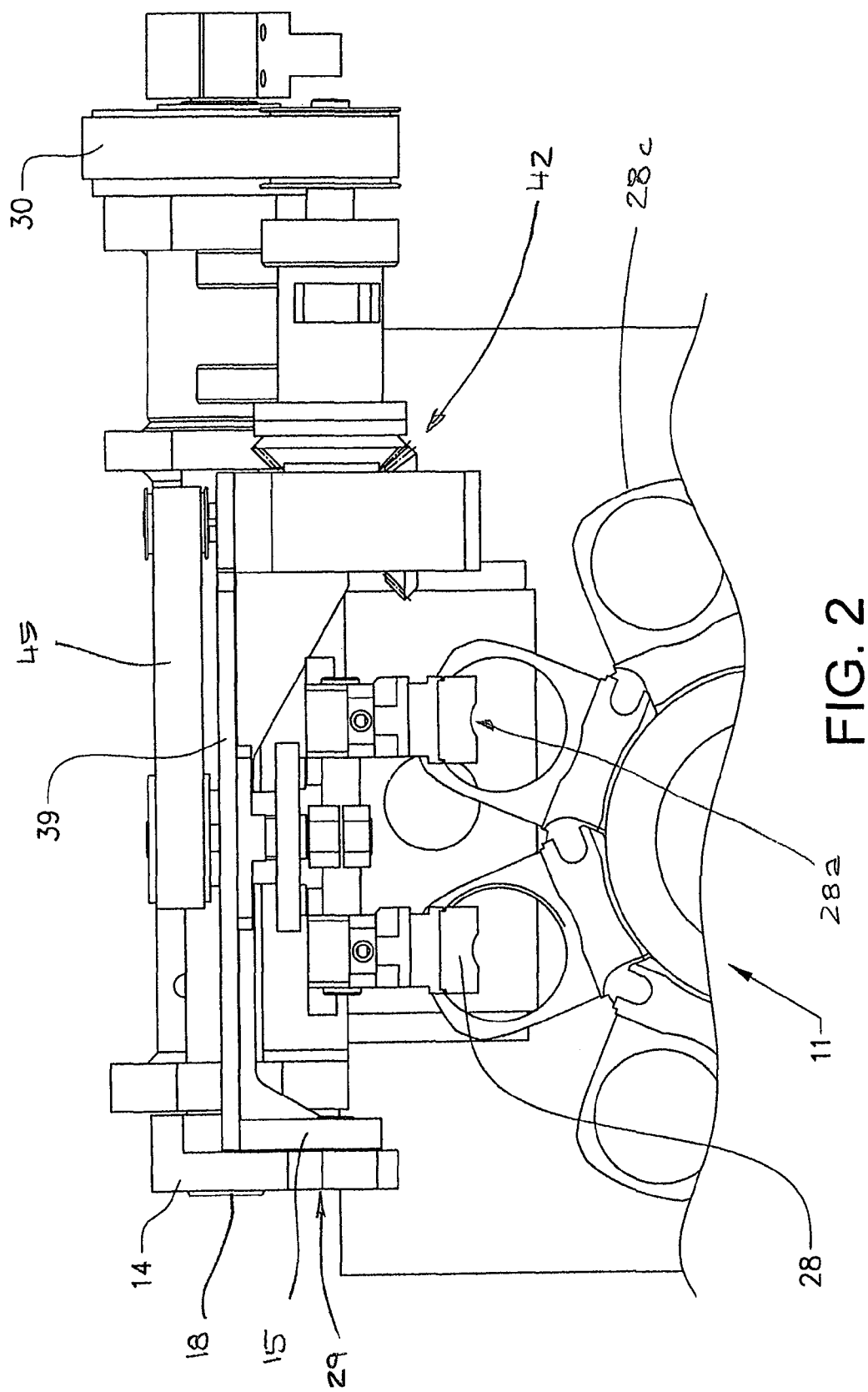
FIG. 2 shows the transfer device of FIG. 1 in a perspective view from above and in the position according to FIG. 1.

FIGS. 1 and 2 show a general transfer device in its pick-up position, which device can be adapted to deliver containers to an optional conveyor, independent of its direction in relation to the transfer device.

Figure 3:
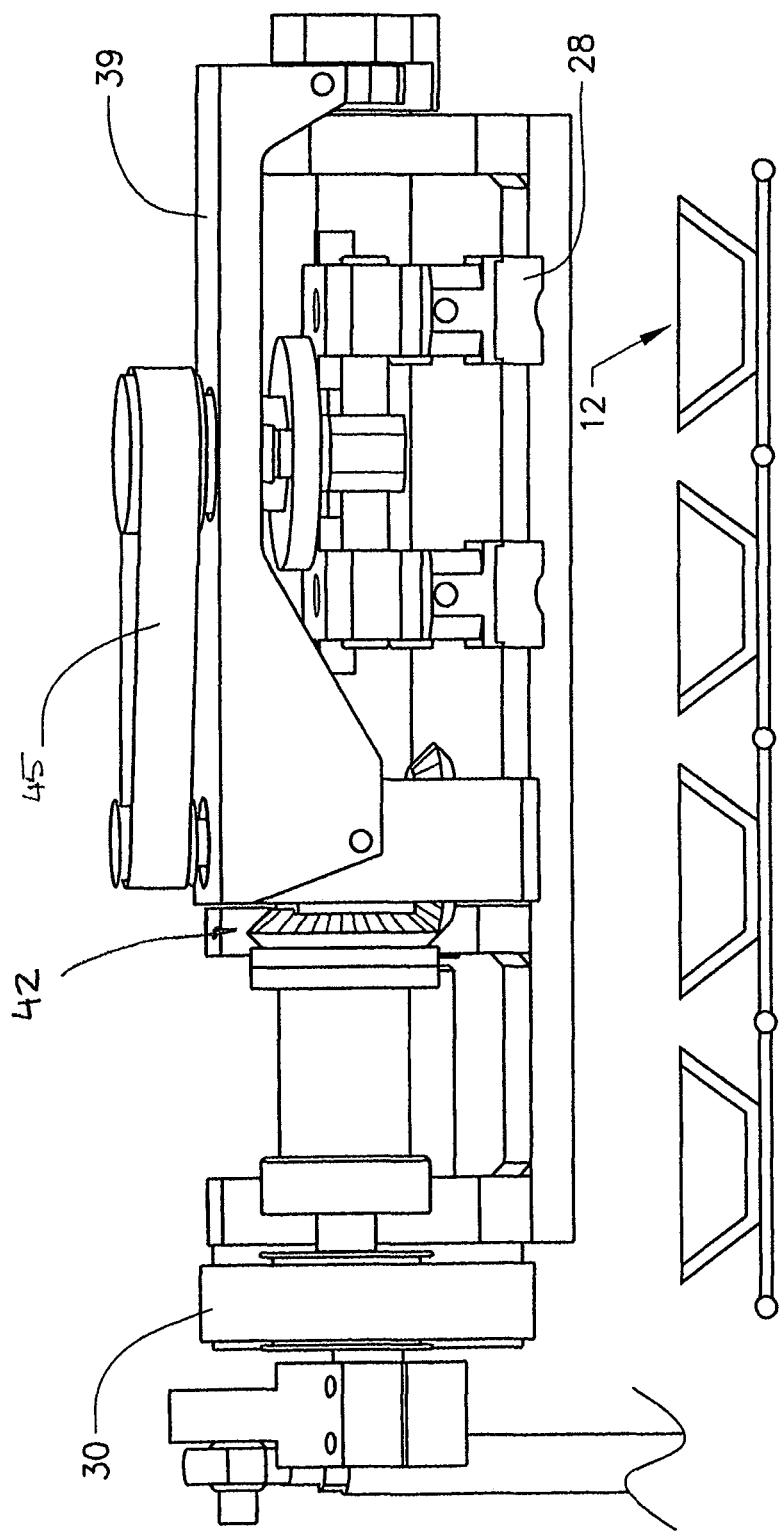
FIG. 3 shows the transfer device in a position for releasing tubes to a continuously operated conveyor in a cartoning machine.
Figure 4:
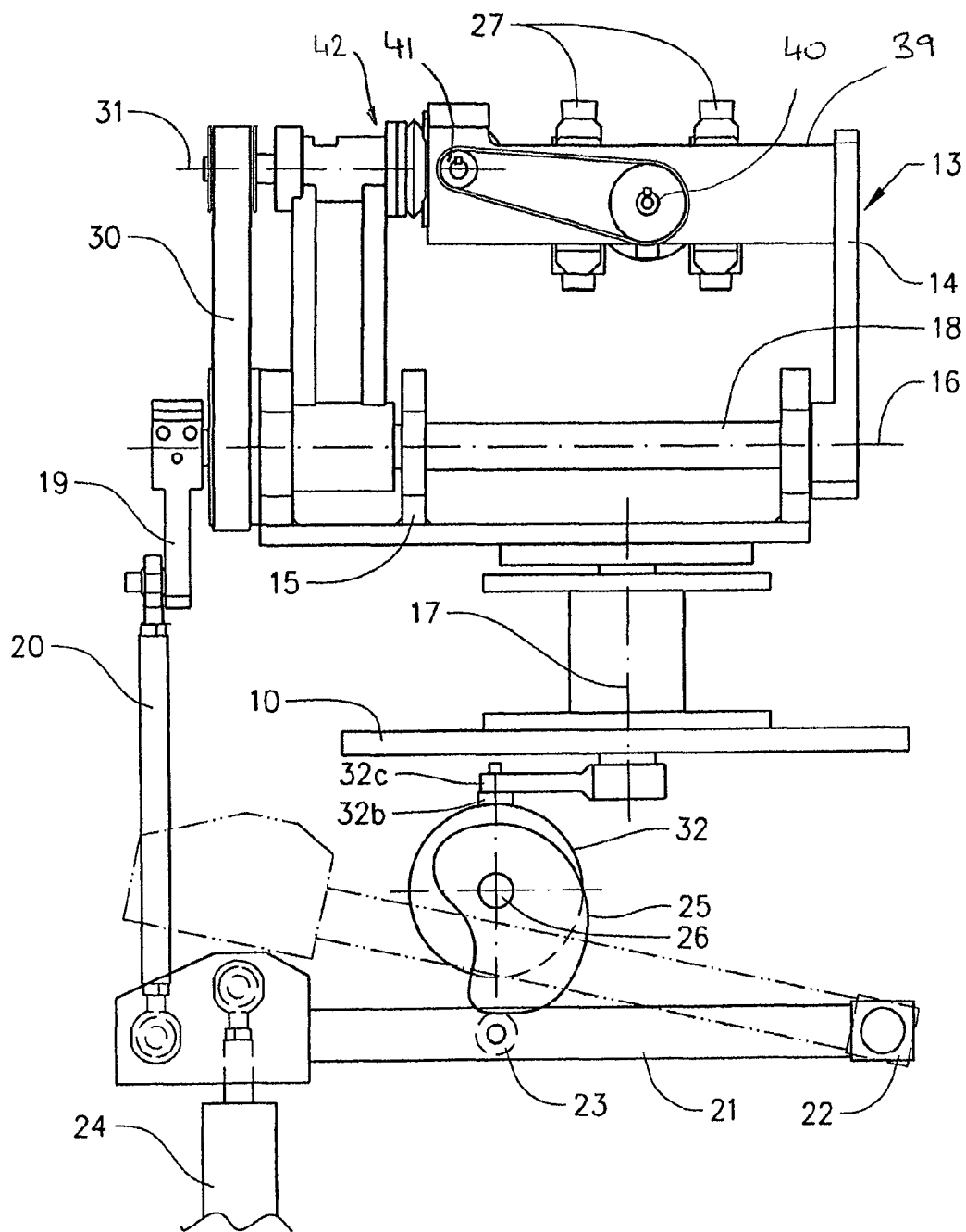
FIG. 4 is a schematic outlined view showing the main component parts of the transfer device.

A first embodiment of the invention is generally illustrated in the FIGS. 3-12. FIG. 4 shows the main components of a transfer arrangement according to the first embodiment. The transfer arrangement is supported on a machine stand 10 at a suitable distance from an intermittently operated conveyor 11 for an intermittently operating filler (FIG. 5) and a continuously operating so-called case conveyor 12 (FIG. 9) in a cartoning machine. A frame arrangement 13 is supported on the stand 10 and comprises a first frame 14 and a second frame 15. The frame 14 can pivot about a pivot axis 16, and the frame 15 can turn about a vertical axis of rotation 17.

To generate the pivoting of the frame 14 about the pivot axis 16, the frame 14 is fixed in terms of rotation on a shaft 18 mounted in the frame 15. Arranged in a rotationally fixed manner on this shaft 18, there is an arm 19 which is connected to an articulated rod 20. The other end of the articulated rod is connected to a cam follower arm 21 which at its other end is mounted in a bearing 22 in the machine stand. On the cam follower arm there is a cam follower roller 23, and a piston/cylinder 24 acting with a spring force loads the arm 21 and the cam follower roller 23 against a cam plate 25 which in turn is fixed in terms of rotation on a drive shaft 26. As will be seen from the figure, the cam plate 25 acts peripherally, and its peripheral design generates, upon rotation of the shaft 26, a reciprocating movement of the cam follower arm 21 between the position indicated by continuous lines and the position indicated by broken lines, and this in turn results in upward and downward movement of the articulated rod 20 and thus a reciprocating rotational movement of the shaft 18 and the frame 14 secured thereon.

Figure 5:
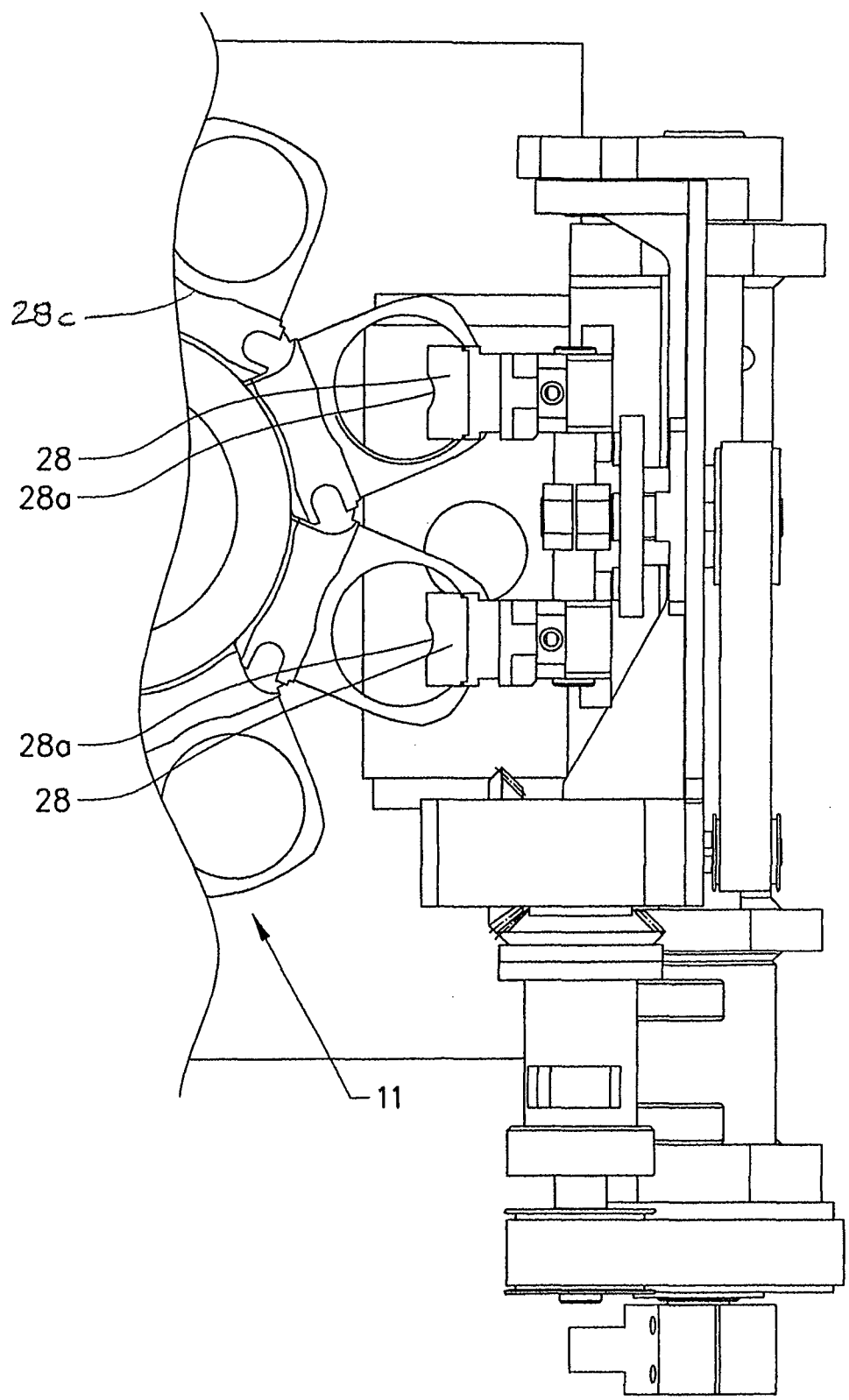
FIG. 5 is a schematic outlined view showing the transfer device in a position for picking up tubes (not shown) from an intermittently operated filling device.
Figure 6:
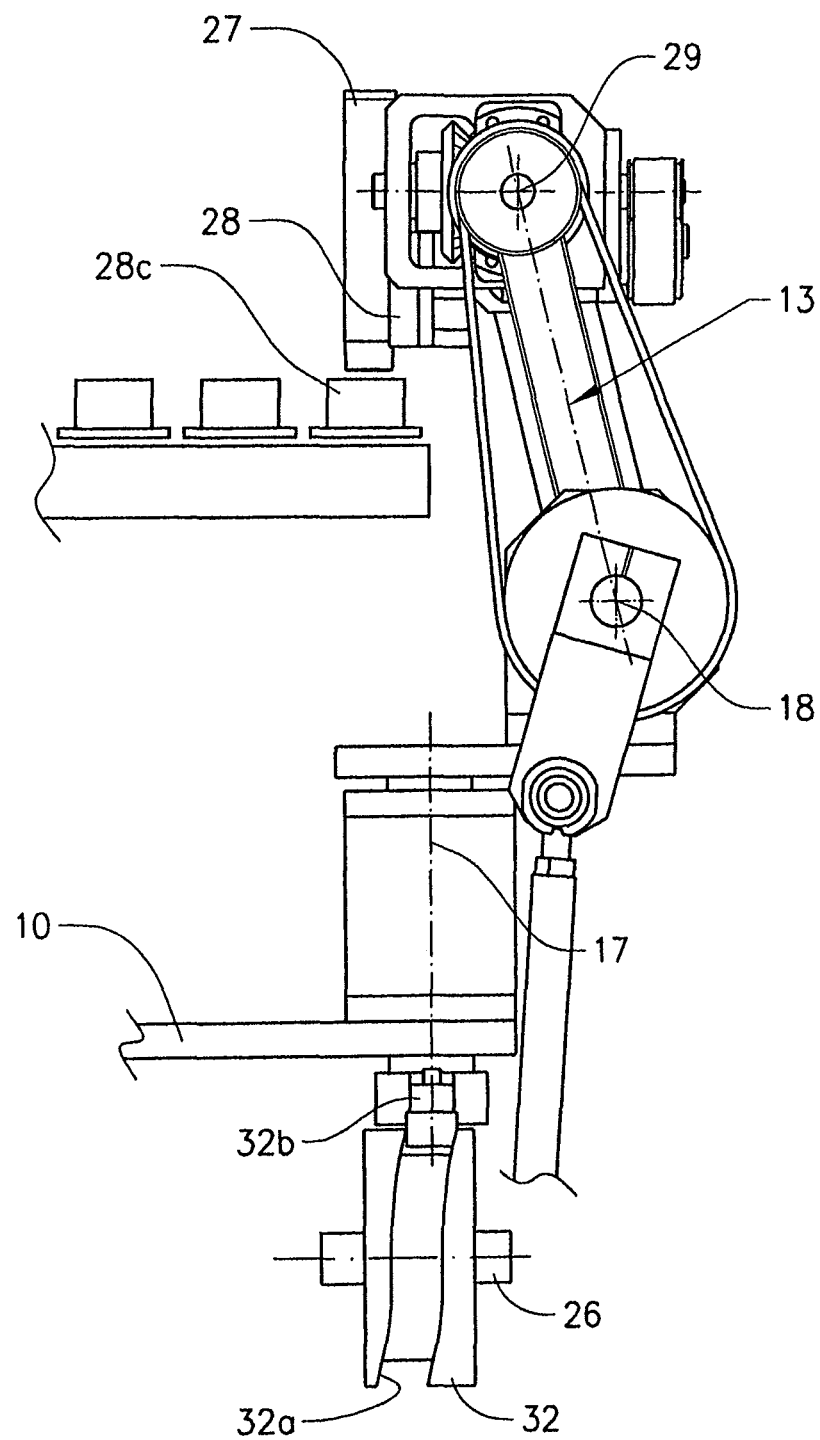
FIG. 6 shows an end view of the transfer device of FIG. 5.

FIG. 4 shows two tubes 27 mounted in a rotationally fixed manner on a shaft 29 of a tube picker/placer 28 (FIG. 5). The shaft 29 is parallel to the shaft 18 of the frame. The shaft 29 is driven by a cam belt 30 and acquires its reciprocating rotational movement from the shaft 18 driven by the articulated rod 20. The tube pickers/placers 28 on the shaft 29 execute a pivoting movement to and fro about a second pivot axis 31.

Figure 9:
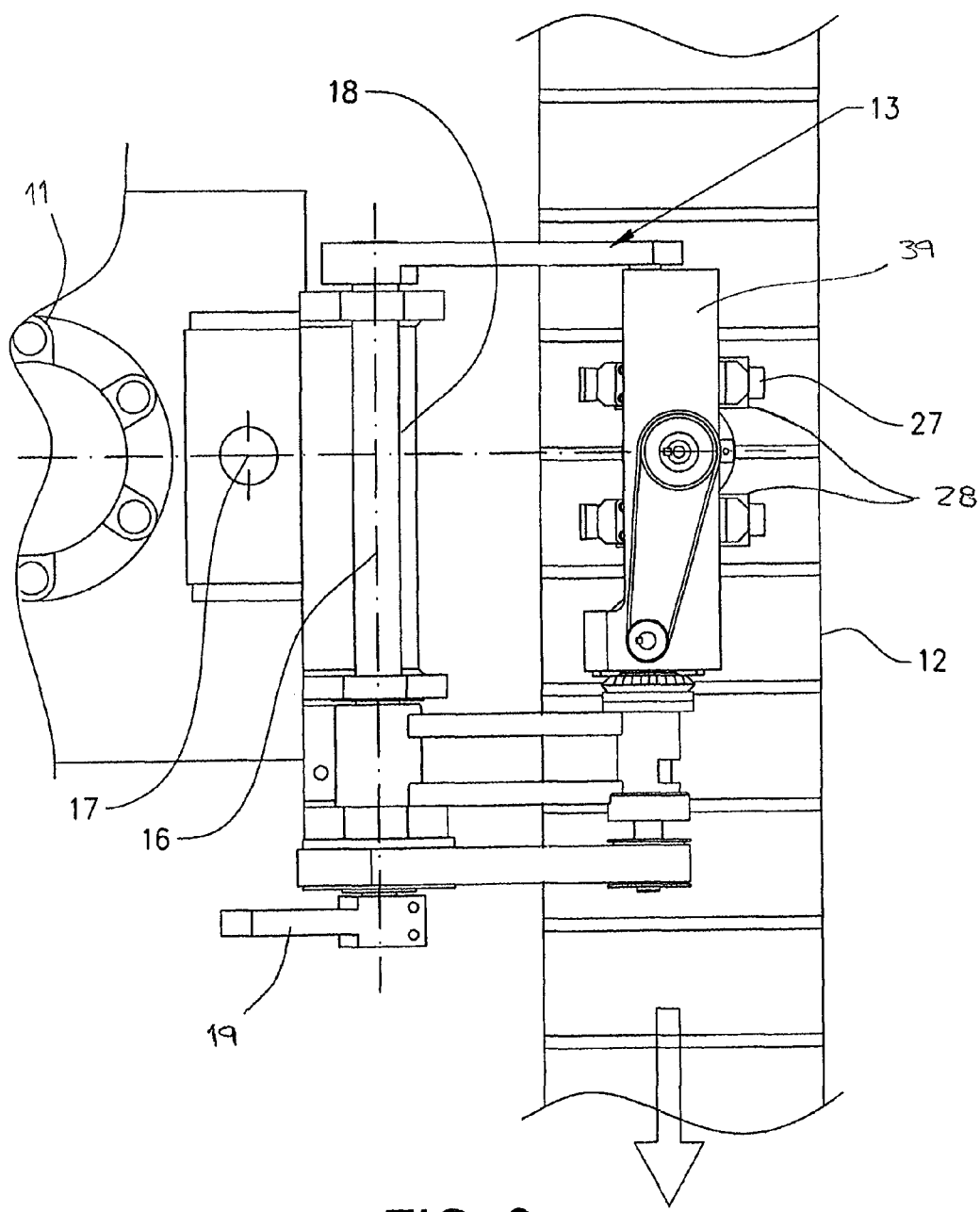
FIG. 9 shows the transfer device rotated towards the conveyor for the cartoning machine, and with the tubes accelerated to the speed of the conveyor and horizontally oriented with the correct partition for being deposited in cases on the conveyor.

During the pivoting movement forwards to the tube release position and back to the tube pick-up position, the tubes are thus given a pivoting movement which is determined by a combination of the pivoting movement of the frame 14 and the pivoting movement of the tube pickers/placers about the pivot axis 31, obtained from the driving of the shaft 29 by the cam belt 30. By designing the radially acting cam plate 25 in a corresponding manner, and by using the articulated rod 20 to give the shaft 18 the necessary turning movement and thus the cam belt 30 the appropriate transmission ratio, the whole set-up is such that by means of the pivoting movement, or tilting movement, of the frame arrangement 14, the tubes 27 are picked up in a vertical position in the tube filler and these tubes are delivered horizontally to the conveyor of the cartoning machine (FIG. 9).

As shown in FIG. 4, the tube pickers/placers 28 are mounted on a shaft 40 that allows them to be rotated about a pivot axis 48 at right angles to the shaft 29. The shaft 40 mounted to be pivoted in a holder 39 that is mounted to be fixed against rotation relative to the shaft 29. The pivoting of the tube pickers/placers 28 is connected to the pivoting movement of the frame arrangement 13 and is achieved by the cam belt 30 driving the shaft 29. In addition to determining the pivoting movement of the tube pickers/placers about the pivot axis 31, the shaft 29 drives a further shaft 41 arranged at right angles to the said shaft 29. This further shaft 41 is mounted fixed against rotation relative to the shaft 29 and is arranged so that its central axis intersects the central axis of the shaft 29. The shaft 41 is driven by a bevel gear drive 42 (see FIG. 20) and is parallel to the shaft 40 supporting the tube pickers/placers 28. The respective shafts 40, 41 are provided with drive wheels 43, 44 at their ends, which drive wheels 43, 44 are connected by a cam belt 45. During the pivoting movement of the frame arrangement 13 from the pick-up position to the release position the container pickers/placer 28 will be rotated between 0° and 180°.

For a transfer device according to FIG. 1 adapted to deliver containers to a conveyor placed in parallel with the pivot axis of the frame the pivot angle is preferably selected to be 0° and 180°, depending on the desired orientation of the container. For a conveyor placed in parallel with the pivot axis of the frame the pivot angle is preferably selected to be +/−90°. By an adaptation of the drive mechanism the device allows the tubes to be rotated to any optional angle relative to the pick-up position and to be oriented with their ends in an optional direction to the conveyor of the cartoning machine.

In addition FIG. 2 shows a perspective view the transfer device of FIG. 1 as seen from above, while FIG. 3 shows the transfer device in a position for releasing tubes to a continuously operated conveyor 12 in a cartoning machine.

In addition to the described pivoting or tilting movement of the frame 14 and the tube pickers/placers 28, an arrangement is provided for limited turning of the frame 15 about the axis of rotation 17, which, as can be seen from FIG. 4, is oriented vertical and centrally in the transfer arrangement. Arranged for this purpose on the drive shaft 26, there is a further cam plate 32 which is of the axially acting type (see FIG. 8, for example). Running in the cam plate track 32a provided for specific movement, there is a cam follower roller 32b which is arranged on an arm 32c connected in a rotationally fixed manner to a shaft (not shown) arranged in a rotationally fixed manner in the frame 15, in order, during movement of the arm 32c in the track 32a, to give the frame 15 a reciprocating rotational movement about the axis of rotation 17.

Figure 7:
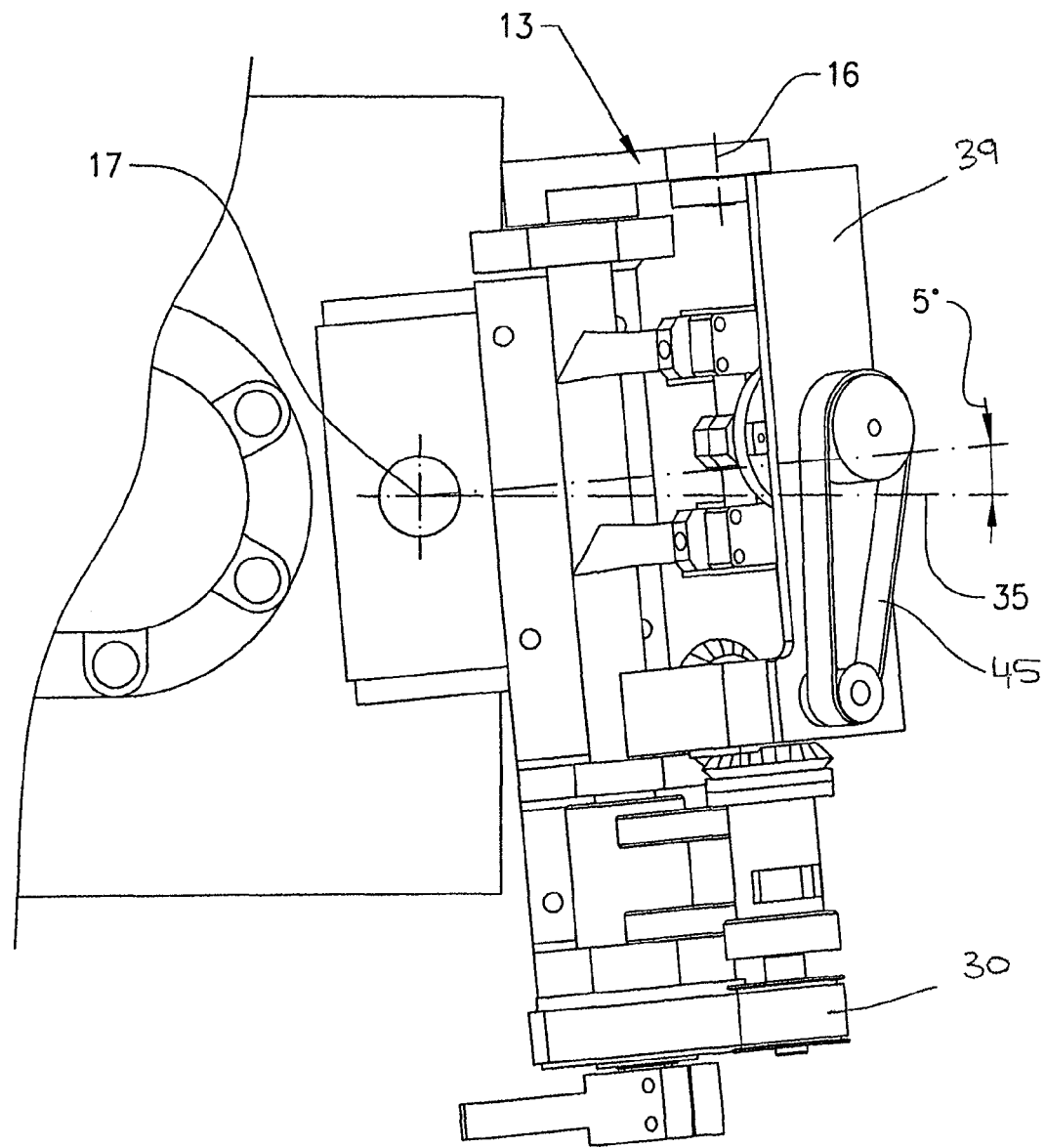
FIG. 7 shows the transfer device in an intermediate position, with the frame holding the filled tubes in a position ready for an accelerating movement.

Thus, as will be described below, during the pivoting or tilting movement of the frame arrangement 13, a turning movement about the axis of rotation 17 is superimposed on the pattern of movement, and this turning movement plays an important part in this context. In fact, during the continuous pivoting of the frame arrangement 13 from pick-up position to release position, it is possible by this means to create an acceleration course for the tube pickers/placers at exactly the right moment, namely immediately before the tubes are to be released to the continuously driven conveyor in the cartoning machine. It has in fact been found in practice that by suitable design of the axially acting cam track arrangement 32a in the cam plate 32 and by corresponding adaptation of the arm 32c, a moderate acceleration course is sufficient to synchronize the movements. FIG. 7 shows, for example, a 5 turn of the frame arrangement 13 for generating an acceleration course to the cartoning machine which, in the example shown, delivers 200 tubes per minute (2 tube pickers/placers).

In addition to this acceleration, however, it is also necessary to be able to handle the positions of the tube pickers/placers parallel to the shaft 29 from the pick-up position (FIG. 5) to the release position. In the illustrative embodiment shown in the drawings, filled tubes are picked up from a part circular path (FIG. 5) in the tube filler and released to a straight path. In addition, the spacing between adjacent tubes on the part circular path differs from the spacing between adjacent tubes which is defined and required by the cases on the conveyor 12.

Figure 20:
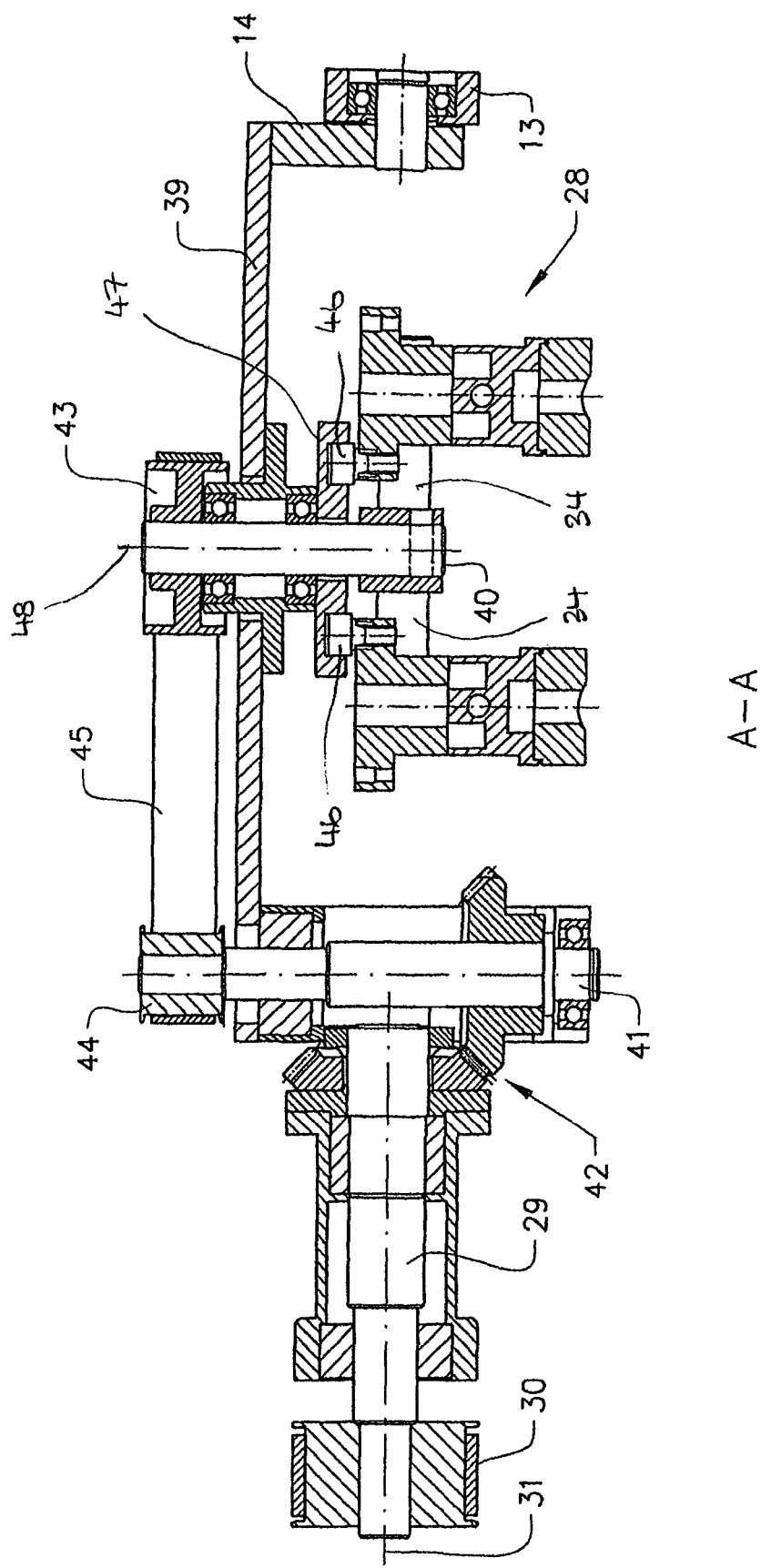
FIG. 20 shows a horizontal cross-section of the transfer device of FIG. 19.

In the illustrative embodiment shown in the drawings, there are two tube pickers/placers on the shaft 29, as shown in FIG. 20. In this case both the pickers/placers, alternatively the outer pickers/placers if three are used, are displaceable in parallel with the shaft 29.

In this way the distance between the tubes can be adjusted in order to be adapted to the distance between two (alternatively three) cases on the continuously operated conveyor. FIG. 20 shows how the required relative displacement of the two tube pickers/placers can be achieved. During the pivoting movement of the frame 14 the cam belt 30 actuates the mechanism for pivoting the shaft 40 about the axis 48, as described above. The shaft 40 is mounted for pivoting movement about a third axis 48 in a holder 39, which is fixed against rotation relative to the shaft 29. The tube pickers/placers 28 are mounted fixed against rotation on the shaft 40, wherein a rotation of the shaft 40 will rotate the tube pickers/placers 28. Simultaneously the tube pickers/placers 28 are arranged displaceable on an axial guide 34 that is mounted fixed against rotation on the shaft 40 at the opposite end from the drive wheel 43. Each respective tube picker/placer 28 is provided with a cam steering 46 arranged to cooperate with a cam disc 47 provided with a groove (not shown) having a spiral shape. The cam disc is mounted fixed against rotation on the holder 39, and concentric with the shaft 40. Rotation of the shaft 40 will cause a forced relative displacement of the tube pickers/placers 28 and their cam steering 46 relative to the cam disc 47.

During the rotation of the shaft 29 by means of the cam belt 30, the outer pickers/placers are arranged to be displaced toward each other or apart along the axial guides 34. Hence, when the frame arrangement 13 has been pivoted or tipped to the position according to FIG. 9, the mutual distance between the tubes is equal to the partition of the conveyor 12.

According to an alternative embodiment (not shown) three tube pickers/placers can be mounted on the shaft (corresponding to the shaft 29), whereby a central tube picker/placer is fixed in a central position on the shaft and the outer are displaceable. The central tube picker/placer is radially displaceable relative to the shaft.

In the pick-up position (see FIG. 5), the central picker/placer will in fact have a shorter length than it does in the release position (see FIG. 9), where all the pickers/placers have the same radial extent viewed from the shaft. As described above the required axial displacement of the outer pickers/placers is controlled by means of axially acting guides (see FIG. 5) arranged at right angles to the shaft. During the turning of the shaft by means of the cam belt, the axially acting guides move the outer pickers/placers towards the central picker and, as has been mentioned above, at the same time the radial length of the central picker/placer viewed from the shaft will be lengthened. After the frame arrangement has been pivoted or tilted to the position (see FIG. 9), the spacing between the tubes is thus identical to the spacing on the conveyor 12, and at the same time the part circle configuration, which the tubes originally had, has been converted to a rectilinear configuration. During the pivoting of the frame arrangement, the original configuration in the form of an arc of a circle is successively straightened out and the axially acting guides will compensate for the height difference between the central picker/placer and the two outer pickers/placers, so as finally, and in a well-ordered manner, by means of the frame arrangement, to allow the tubes to be placed in the cases on the conveyor.

Each picker/placer has a cup-shaped recess 28a adapted to the contour of the tubes, and the tubes are fixed in position by means of vacuum attachments 28b all the way from pick-up according to FIG. 5 to release according to FIG. 9. This provides positive in-built security against failure and gives the exact position of each tube throughout the entire process.

For those aspects of the transfer process which have not already been discussed above, reference is made to FIGS. 5 to 10 which show a complete transfer cycle.

Thus, in FIG. 5, filled tubes are picked up from a part circular path of an intermittently operating tube filler. The pickers/placers 28 have in this case a positioning corresponding to the part circular configuration of the tubes. The frame arrangement 13 is in the position shown in the side view in FIG. 6. The vacuum is established via attachments 28b and vacuum in the cavities 28a engage the tubes via elastic inserts after these have been lifted by ejectors (not shown) in tube holders 28c in the filler 11.

FIG. 7 shows an intermediate position during the pivoting movement of the frame arrangement 13 forwards to the position according to FIG. 9. In this intermediate position, the axially acting cam guide 32, by turning about the axis of rotation 17, has effected a 5° turn of the frame arrangement 13 anticlockwise from the line 35. The frame arrangement, with the pickers/placers arranged thereon, is thus in a starting position for commencement of an acceleration movement in the clockwise direction under the control of the axially acting cam guide 32. By suitable design of the latter, it has been found that a 5° turn about the axis of rotation 17 is sufficient for the pickers/placers to assume a peripheral speed, in the position according to FIG. 9, corresponding to the speed of the conveyor 12. Since the spacing between the pickers/placers corresponds to the spacing of the cases on the conveyor, and in addition since the tubes are oriented in a straight line, these tubes can be easily dropped into the respective case by interrupting the vacuum to the attachments 28b.

Figure 8:
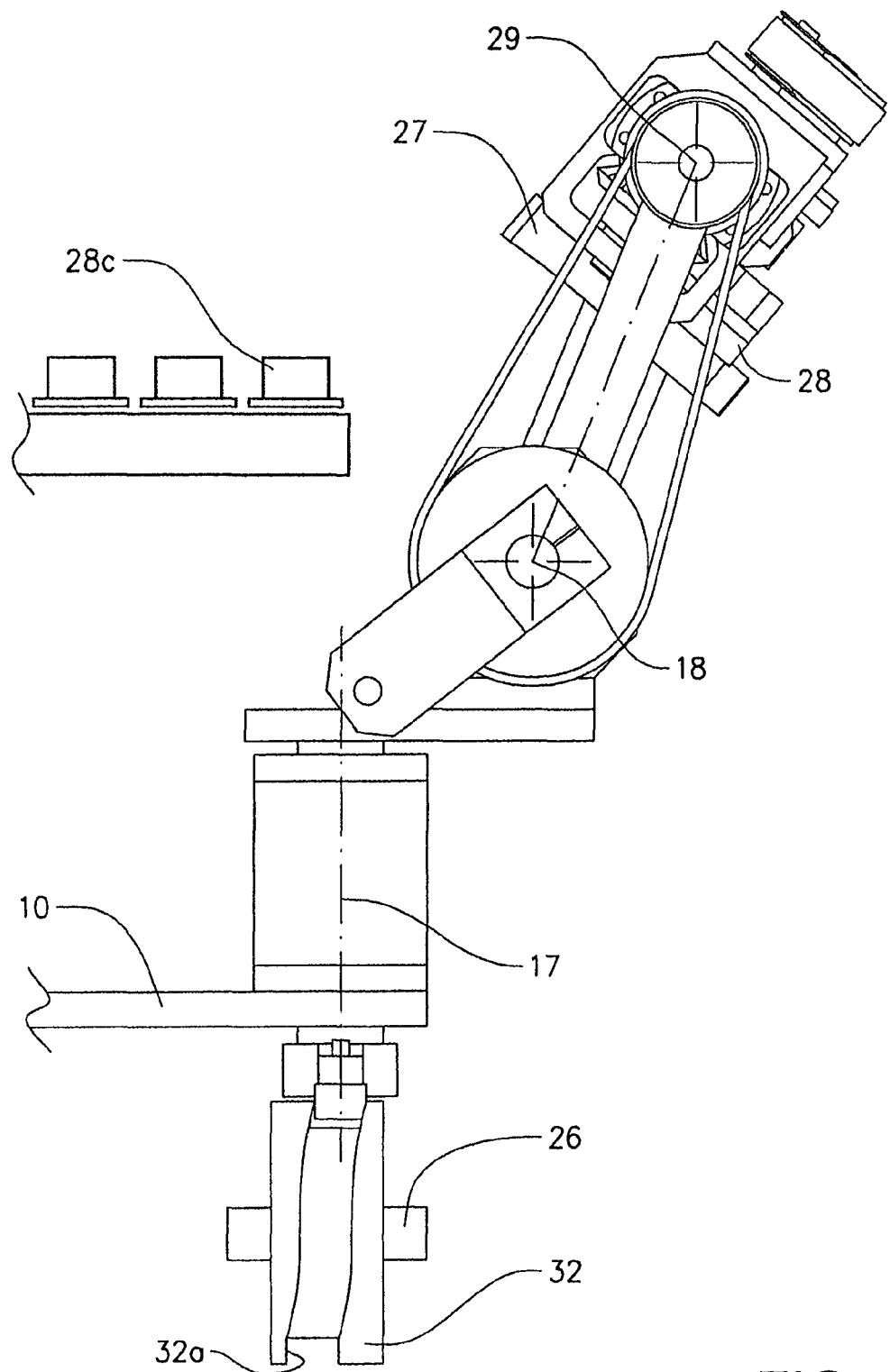
FIG. 8 shows an end view of the transfer device of FIG. 7.

FIG. 8 shows, in a side view, the position of the frame arrangement 13 and associated parts in the intermediate position of FIG. 7.

Figure 10:
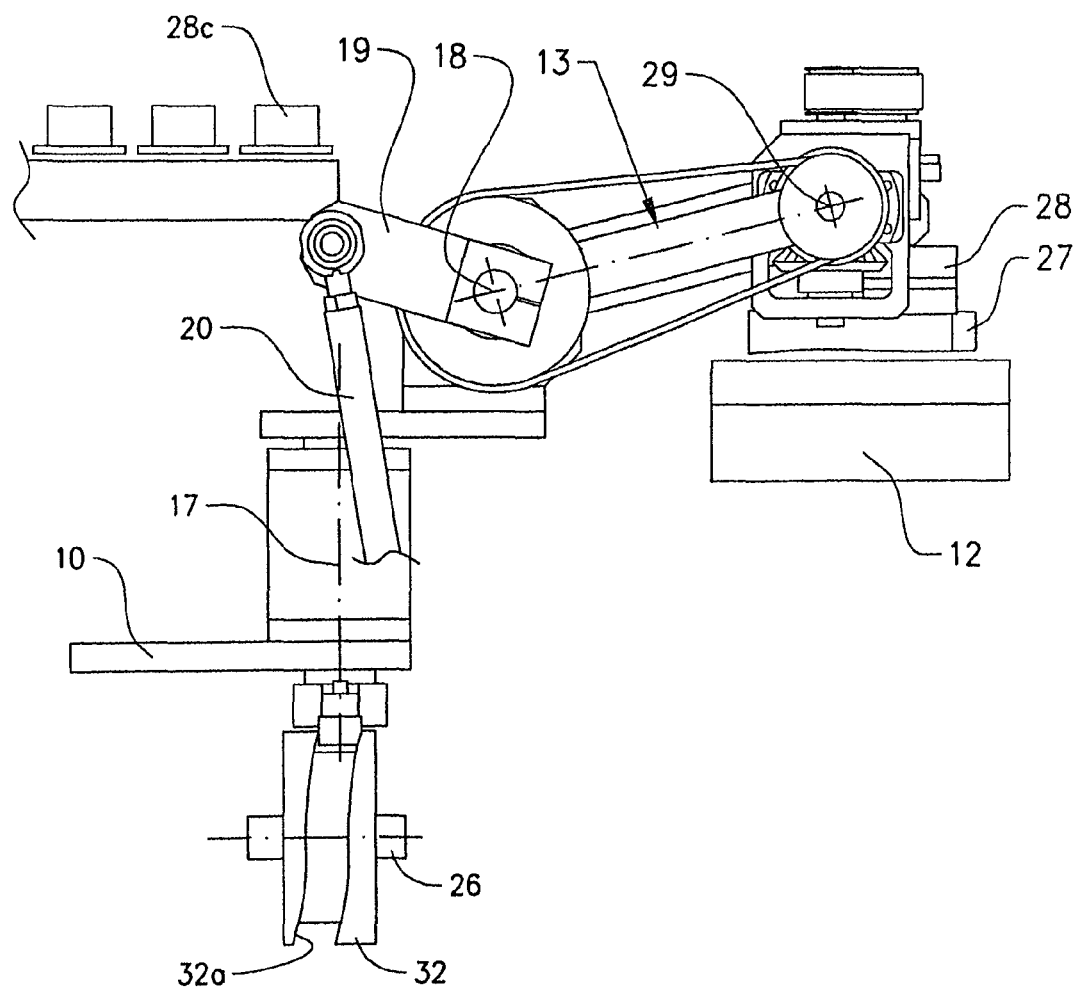
FIG. 10 shows an end view of the transfer device of FIG. 9.

As has already been mentioned, the tubes in the position according to FIG. 9 are oriented horizontal and with the necessary spacing, and the frame arrangement 13 is in the position shown in FIG. 10.

Figure 11:
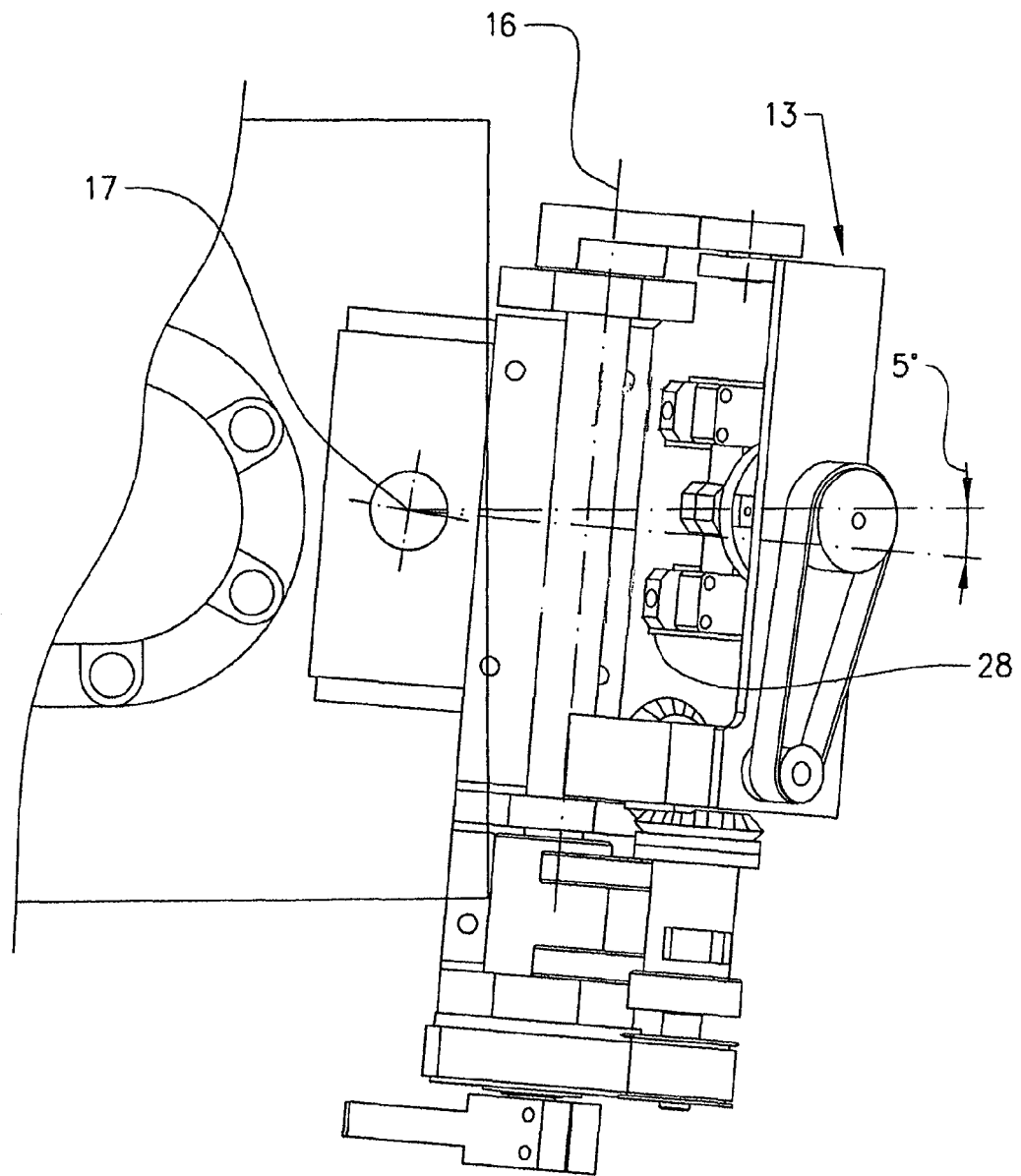
FIG. 11 shows the transfer device in an intermediate position, returning to the pick-up position without tubes, at the end of a retarding phase.
Figure 12:
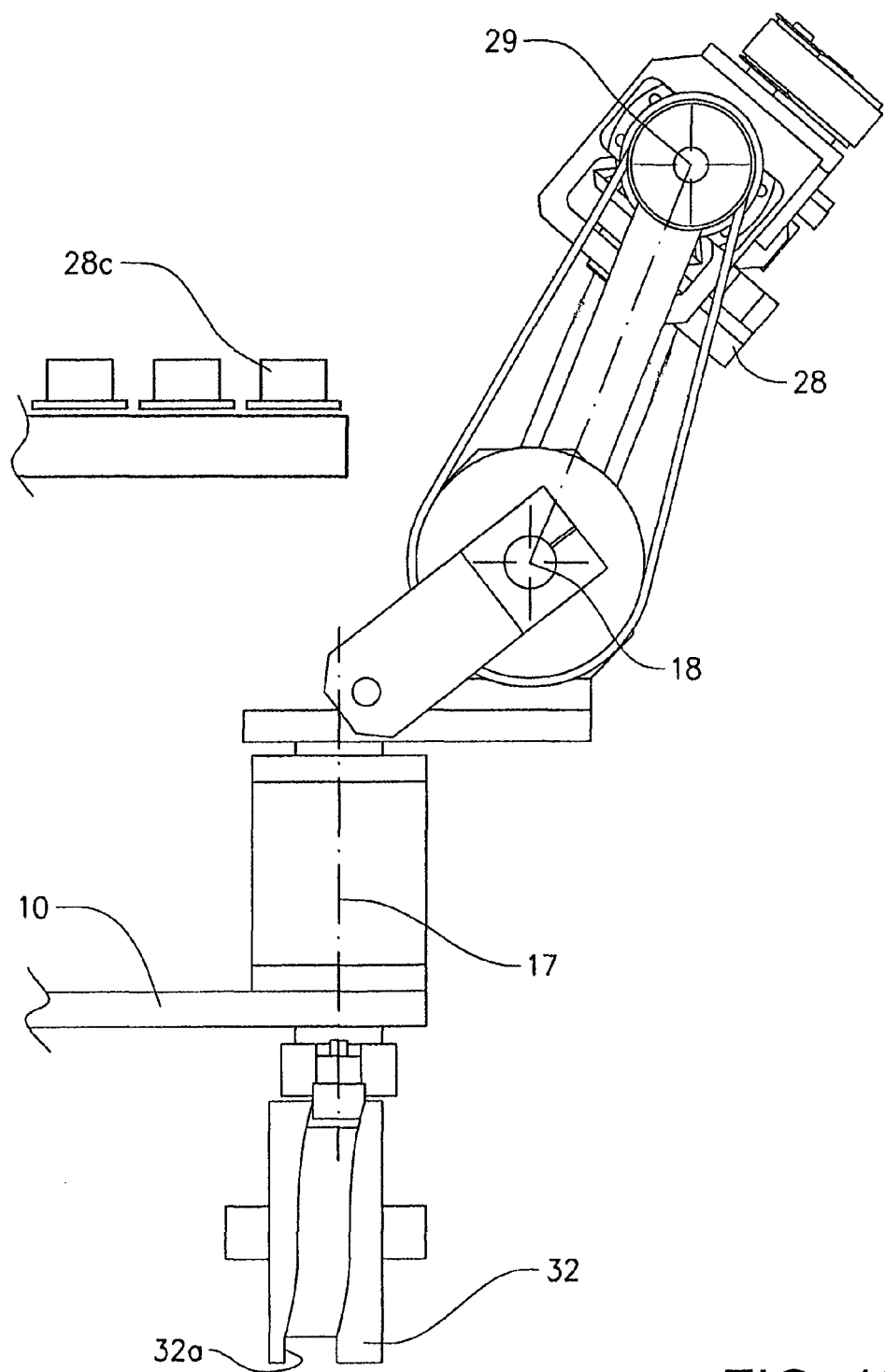
FIG. 12 shows a side view of the transfer device of FIG. 11.

After the tubes have been released, the frame arrangement 13 gradually assumes a position according to FIG. 11. This position represents an intermediate position in which the frame arrangement 15 has been turned about the axis of rotation 17 by means of the axially acting cam guide in order, during a turning movement of 5°, to permit deceleration of the turning movement of the frame about the axis of rotation 17.

After this intermediate position, the frame arrangement and associated parts return to the positions which are shown in FIG. 1. Although the pivoting/tilting movement of the frame arrangement is shown in different phases in FIGS. 1 to 11, it will of course be appreciated that this movement takes place in one sequence and very quickly. Since the tubes are held in place by a positive gripping force throughout the entire pattern of movement, secure and correct handling is guaranteed at very high speeds.

The above example describes a first embodiment of the invention where the frame arrangement 13 is made to perform an accelerating movement about the said vertical axis 17 during its pivoting movement to the container release position. The acceleration is performed so that the speed of the container pickers/placers 28 corresponds to the continuous speed of the second conveyor 12 in the release position. This embodiment is preferably used where the second conveyor is placed with its main direction of transport arranged substantially parallel to the first horizontal axis of the frame arrangement.

According to a second embodiment of the invention, shown in FIGS. 13-20, the frame arrangement 13 performs a pivoting movement to the container release position about the first, horizontal axis 16. At the same time as this pivoting movement, the tube pickers/placers 28 perform a pivoting movement about the axis 31 and a rotation of the holder supporting the container pickers/placers 28. The holder is rotated a predetermined angle about a shaft arranged at right angles to the axis 31.

Figure 13:
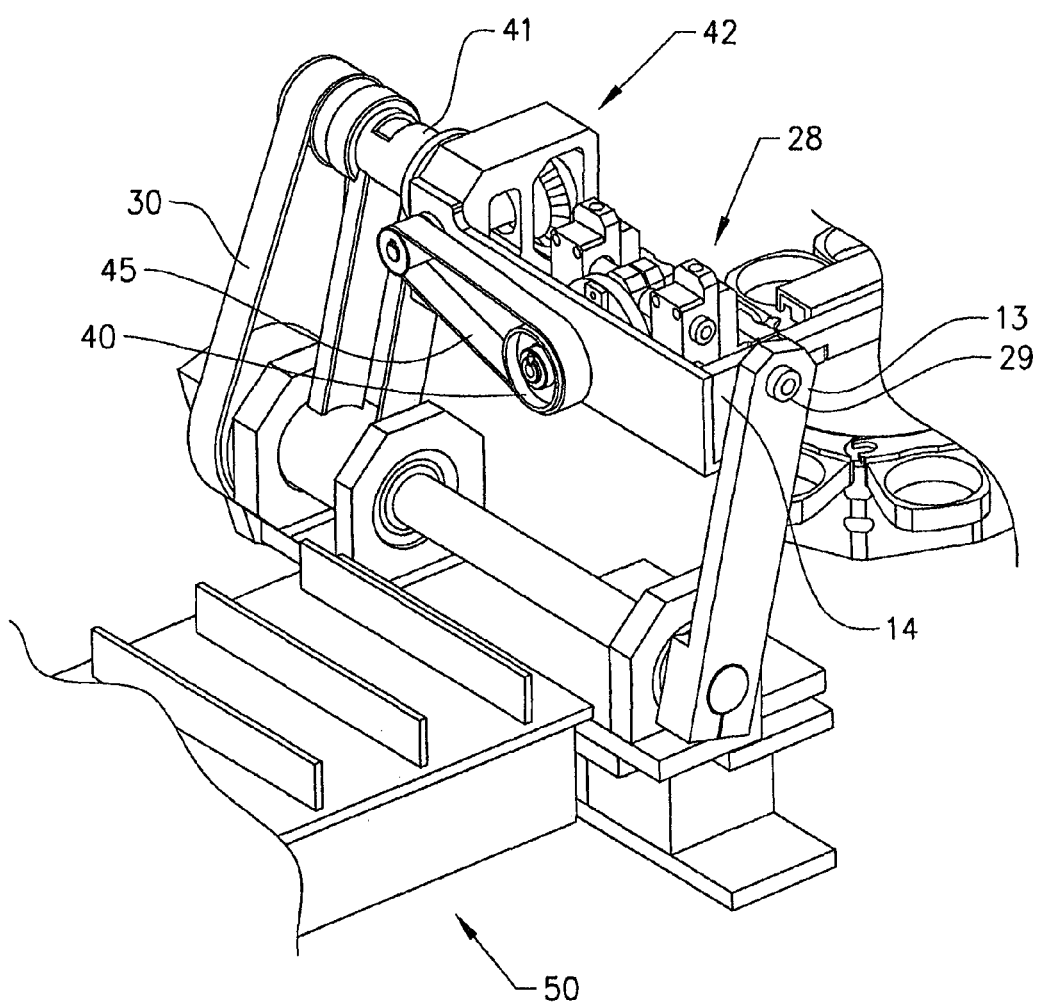
FIG. 13 shows a perspective view, from one end wall, of a transfer device according to a second embodiment of the invention.

This embodiment is preferably, but not necessarily, used where the second conveyor 50 is placed with its main direction of transport arranged substantially at right angles to the first horizontal axis as shown in FIG. 13.

Figure 14:
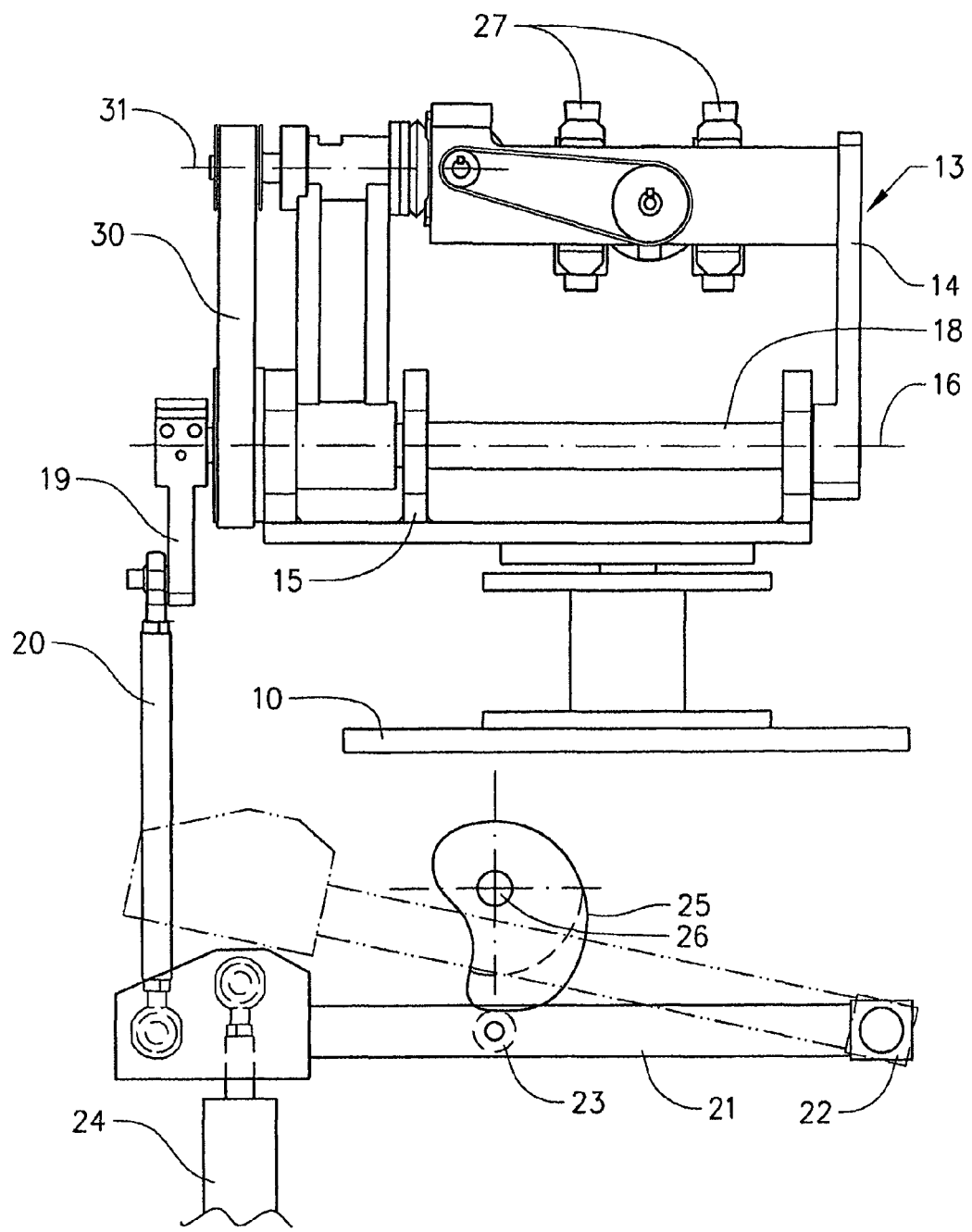
FIG. 14 is a schematic outlined view showing the main component parts of the transfer device in FIG. 13.

The pivoting movement of the frame arrangement 13 is arranged to be controlled in the same way as described in connection with FIG. 4 above, with the exception that the mechanism for rotation about the vertical axis 17 is missing, as shown in FIG. 14.

Figure 15:
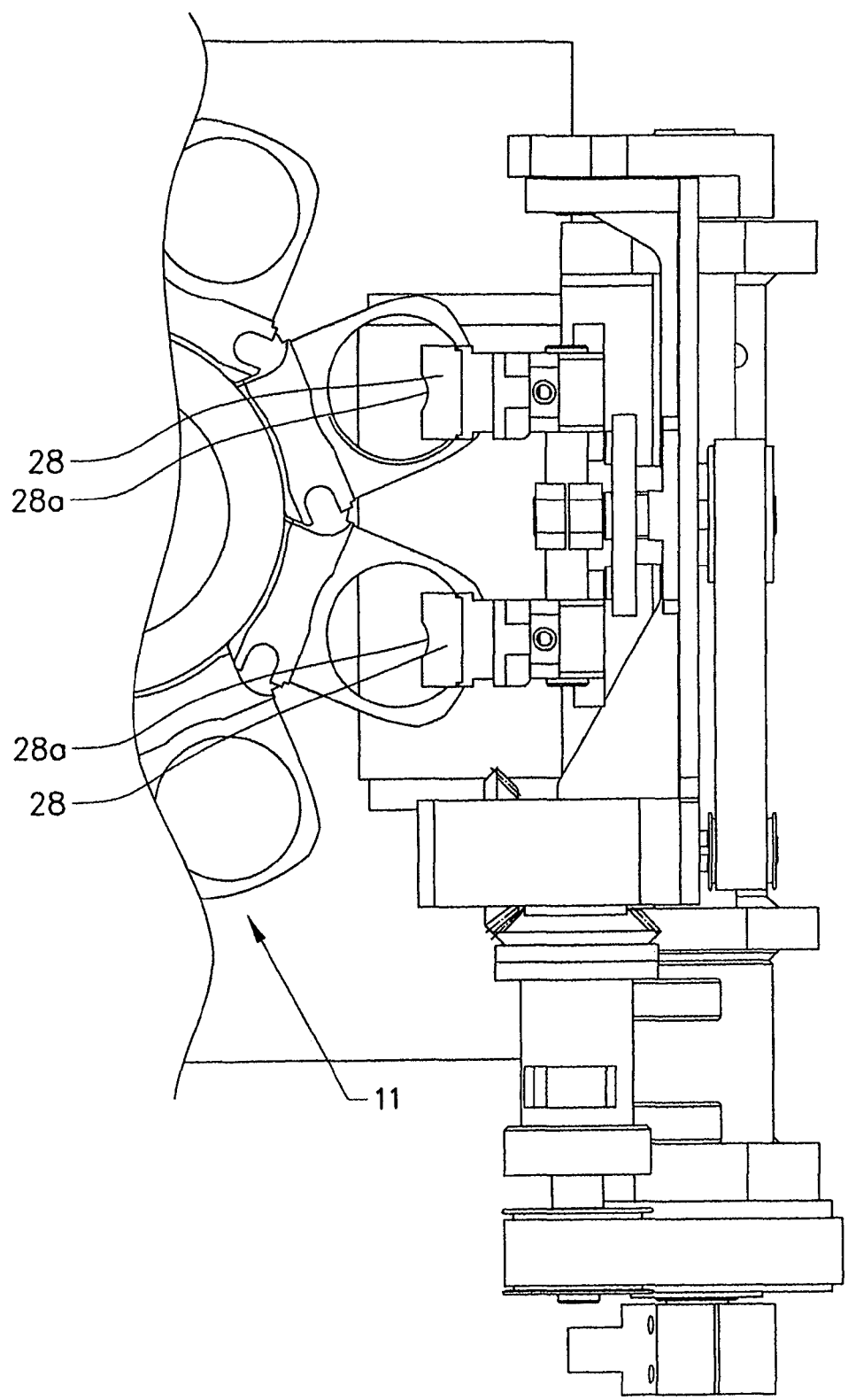
FIG. 15 is a schematic outlined view showing the transfer device in FIG. 13 a position for picking up tubes from a filling device.
Figure 16:
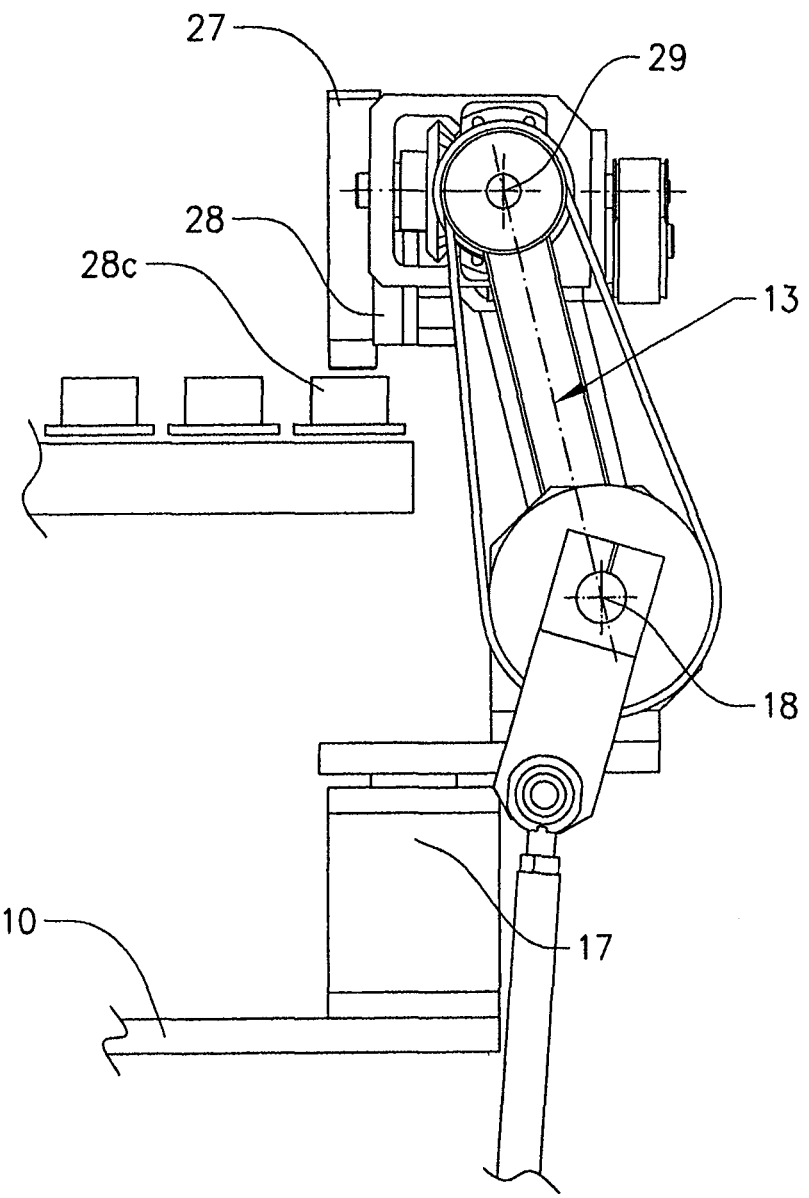
FIG. 16 shows an end view of the transfer device of FIG. 15.

FIG. 15 shows a plan view of the pickers-/placers 28 in its pick-up position. In FIG. 15 two filled tubes at the time are picked up from a part circular conveyor on an intermittently operating tube filler. Hence the pickers-/placers 28 are positioned relative to the part circular tube configuration with the central picker-/placer retracted through folding about the joint 33. The frame arrangement 13 is in the position shown in FIG. 16. The vacuum is established via attachments 28b and vacuum in the cavities 28a engage the tubes via elastic inserts after these have been lifted by ejectors (not shown) in tube holders 28c in the filler 11. With respect to pick-up and mutual positioning of the tubes, the function of the transfer device corresponds to the arrangement described in connection to FIG. 5 above.

Figure 17:
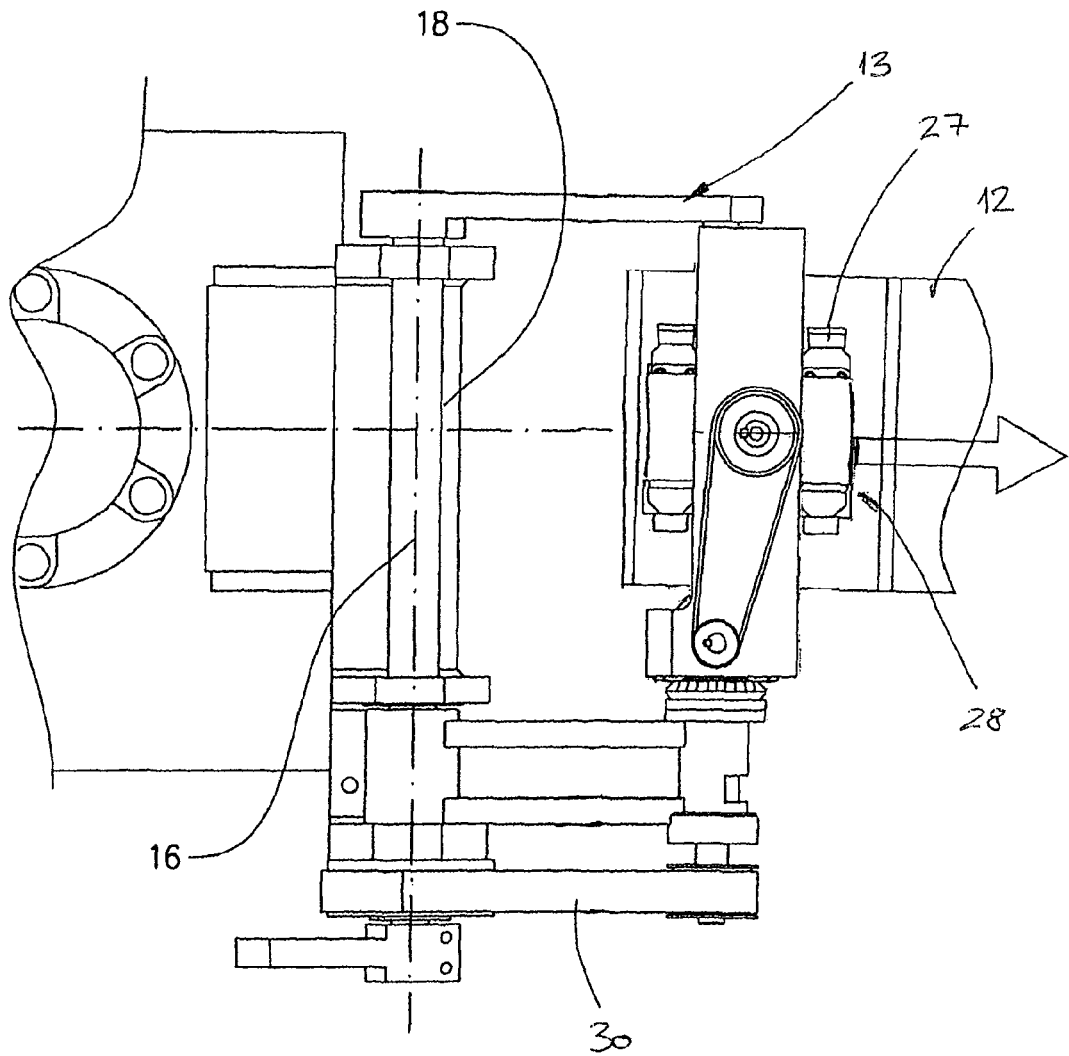
FIG. 17 shows the transfer device according to FIG. 13 rotated towards the conveyor for the cartoning machine.

After the frame arrangement 13 has been pivoted or tilted to the release position shown in FIG. 17, the spacing between the tubes is thus identical to the partition on the conveyor 12

Figure 18:
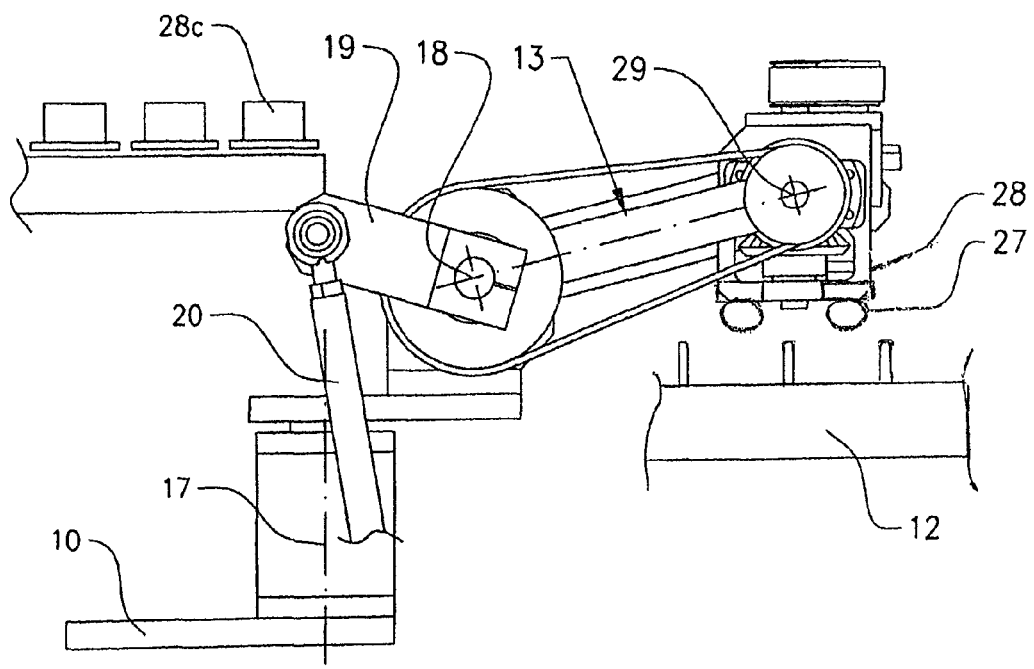
FIG. 18 shows an end view of the transfer device of FIG. 17.

At the same time as the frame arrangement 13 has been rotated to the release position, the holder supporting the container pickers-/placers 28 ahs been turned over an angle of 90° clockwise or anticlockwise, whereby the seals of the tubes are turned towards the viewer as shown in FIG. 18.

As already stated, the tubes are oriented horizontally and with the desired spacing in the release position, and the frame arrangement is in the position shown in FIG. 17. Adjustment of the spacing can be performed in the same way as described in connection with FIG. 20 above.

Figure 19:
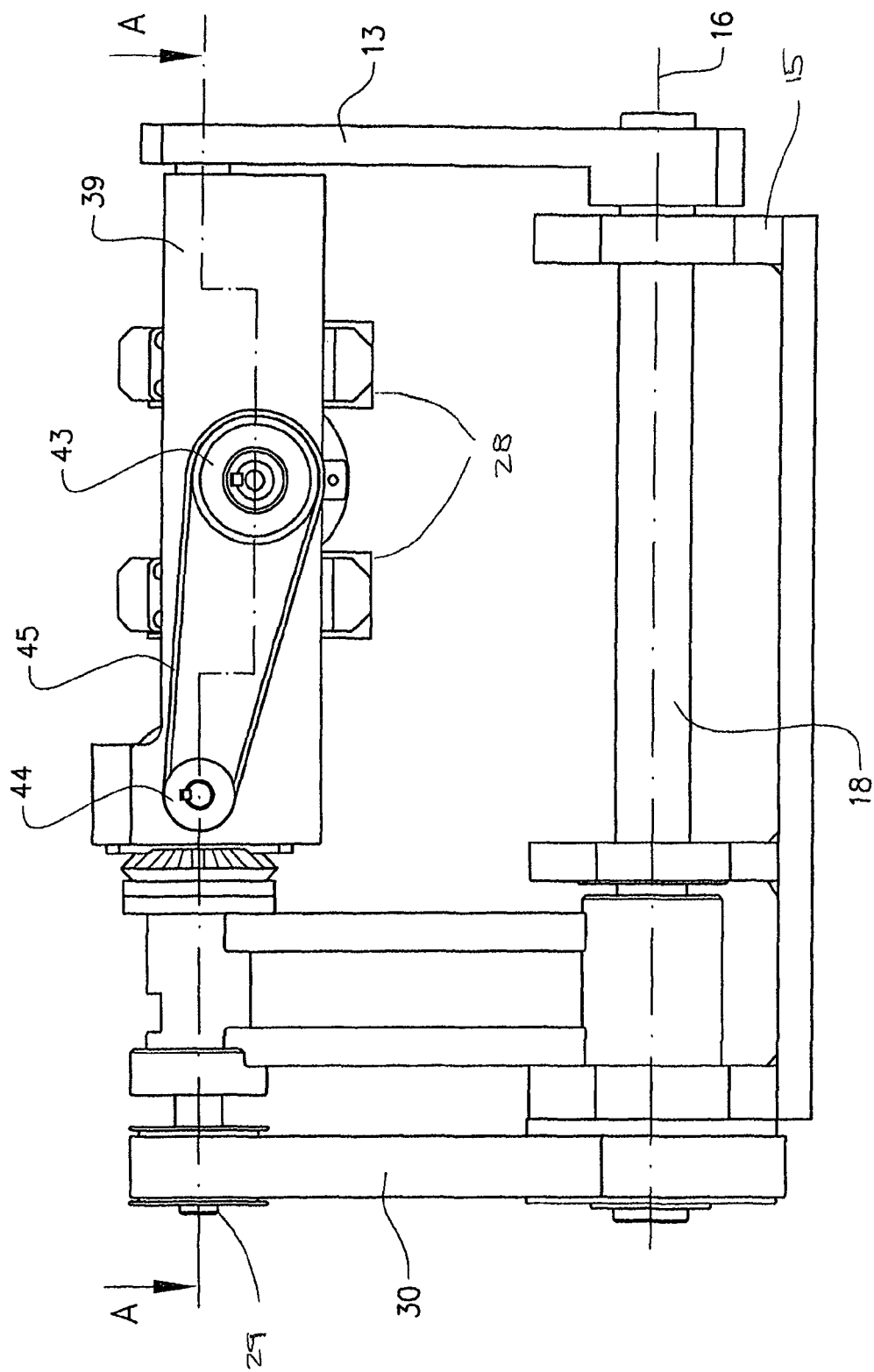
FIG. 19 shows the transfer device according to the first and second embodiments rotated to its pick-up position.

FIG. 19 shows the transfer device used in both the first and the second embodiments placed in its pick-up position. As shown in FIG. 19 the tube pickers-/placers 28 are mounted on a shaft 40 that allows them to be rotated relative to the shaft 29. The shaft 40 is mounted for pivoting movement in a holder 39, which is fixed against rotation relative to the shaft 29. The pivoting movement of the tube pickers/placers 28 is connected to the pivoting movement of the frame arrangement 13, and is achieved by the cam belt 30 driving the shaft 29. Apart from determining the pivoting movement of the tube pickers-/placers about the axis 31, the shaft 29 drives a further shaft 41 arranged at right angles to the shaft 29.

This further shaft 41 is mounted fixed against rotation relative to the shaft 29 and is arranged so that its central axis intersects the central axis of the shaft 29. The shaft 41 is driven by a bevel gear drive 42 (see FIG. 20) and is parallel to the shaft 40 supporting the tube pickers/placers 28. The respective shafts 40, 41 are provided with drive wheels 43, 44 at their ends, which drive wheels 43, 44 are connected by a cam belt 45. During the pivoting movement of the frame arrangement 13 from the pick-up position to the release position the container pickers/placers 28 will be rotated 180°. By an adaptation of the drive mechanism the device allows the tubes to be oriented with their ends in an optional direction to the conveyor of the cartoning machine. Adjustment of the relative spacing between the tubes to the partition of the receiving conveyor can be performed using the mechanism described in connection with FIG. 20 above Although the invention has been described with reference to two illustrative embodiments, it will be appreciated that the inventive concept according to the attached patent claims can be applied in contexts other than packaging tubes. For example, the transfer arrangement can be used between all sorts of units in a packaging line where synchronizing between different patterns of movement is required. However, an important feature in this connection is that the container pickers/placers are given a suitable acceleration course at the final stage in order to achieve the desired synchronizing. The tubes do no necessarily need to be tilted from a vertical to a fully horizontal position, from pick-up to release, although this is preferable.

Hence the invention is not limited to the scope of the appended claims. For example, the horizontal shaft 18 can be driven in a number of different ways corresponding to the reciprocation vertical movement described. The drive can also be performed using a reciprocating horizontal movement and can be achieved using different linkage arrangements combined with a hydraulic or electrical device. A suitable mechanism of this type can be connected to a lever mounted on either side of the shaft 18. Hence, the invention is not limited to the drive systems described in FIGS. 4 and 14.

The invention claimed is:

1. A method for transferring packaging containers from a first conveyor to a second conveyor, the method comprising:
    arranging one or more container pickers/placers on a frame that can pivot about a first horizontal axis from a container pick-up position to a container release position and back to the container pick-up position;
    causing the container pickers/placers on the frame to grip a one or more containers on the first conveyor;
    arranging the said container pickers/placers to be pivoted relative to said frame arrangement about a second horizontal axis, parallel with the said first axis by means of a transmission connecting the first and second axis; and
    making the container picker/placer perform a rotating movement about a third axis, at right angles to and rotatable about the second axis during its pivoting movement to the container release position; wherein the rotating movement about the third axis is caused by a mechanical connection driven by the relative movement between the pivoted frame and the second axis or caused by a drive unit on the picker/placer.

2. The method according to claim 1, wherein the frame is made to perform an accelerating movement about a fourth, vertical axis during its rotating movement to the container release position, and
    the acceleration is performed in such a way that the speed of the container pickers/placers in the release positions corresponds to the continuous speed of the second conveyor.

3. The method according to claim 1, wherein the container pickers/placers are displaced to a mutual distance corresponding to the mutual distance between containers, or the partition, of the second conveyor unit during the said rotating movement of the frame to the container release position.

4. The method according to claim 3, where the first conveyor is part circular and the containers are picked up from this conveyor,
    wherein the differences in height between the containers picked from a part circular section of the first conveyor and resulting from the rotating movement are compensated for.

5. The method according to claim 2, where the containers are vertically oriented in the first conveyor,
    wherein the rotating movement about the second axis in combination with the rotating movement about the first horizontal axis is performed so that the containers arrive horizontally to the second conveyor.

6. The method according to claim 1,
    wherein the container picker/placer is made to perform a rotating movement about the third axis in a first direction during its pivoting movement from the container pick-up position to the container release position.

7. The method according to claim 6, wherein the container picker/placer is made to return to container pick-up position against the first direction.

8. The method according to claim 6, wherein the container picker/placer is made to return to container pick-up position in the first direction.

9. The method according to claim 1, wherein the container picker/placer is made to perform a rotating movement about the third axis over a predetermined angle during its pivoting movement from the container pick-up position to the container release position.

10. The method according to claim 9, wherein the predetermined angle is up to 180°.

11. The method according to claim 10, wherein the predetermined angle is up to 90°.

12. A transfer device for transferring filled containers from a first conveyor to a second conveyor, the transfer device comprising:
    a frame rotatable about a first horizontal shaft and mounted on a stand outside the first conveyor of after a filling device,
    a container picker/placer rotatably mounted in the frame,
    a device arranged to perform a rotation of the frame about said first shaft, from a pick-up position to a release position, and back to the pick-up position,
    a device arranged to perform a rotation of the said container picker/placer relative said frame about a horizontal second shaft, parallel to the first shaft, and
    a transmission connecting the first and second shafts and arranged to control the rotation of the container picker/placer about the horizontal second shaft, wherein the transfer device further comprises a device arranged to perform a rotation of the container picker/placer about a third shaft comprises either a mechanical connection arranged between the frame and the second shaft and driven by the relative movement between the pivoted frame and the second axis, or a drive unit mounted on the picker/placer.

13. The transfer device according to claim 12, further comprising:

a device for rotating the frame about a vertical shaft in order to provide an acceleration distance for the said container pickers/placers during the rotation of the frame to the container release position, and device arranged to trigger and control the acceleration over the said acceleration distance, so that the container pickers/placers are synchronized with the continuously operated second conveyor.

14. The transfer device according to claim 12, wherein the intermittently operated first conveyor is an at least part circular conveyor.

15. The transfer device according to claim 14, wherein the transfer device comprises means for displacing the container pickers/placers to a mutual distance corresponding to the partition of the cartoning machine during the rotating movement of the frame up to the container release position, and means for compensating for differences in vertical position between the containers picked from the part circular conveyor of the filling unit during the rotating movement so that a set of containers are placed in a straight line when released to the cartoning machine.

16. The transfer device according to claim 12, wherein the container picker/placer is arranged to be rotated about the third shaft over a predetermined angle from the container pick-up position to the container release position.

17. The transfer device according to claim 16, wherein the predetermined angle is up to 180°.

18. The transfer device according to claim 17, wherein the predetermined angle is up to 90°.

19. The transfer device according to claim 18, wherein the transfer device is arranged to transfer packaging containers in the form of tubes.

* * * * *

UNITED STATES PATENT AND TRADEMARK OFFICE
CERTIFICATE OF CORRECTION

PATENT NO.       : 8,413,790 B2                                   Page 1 of 1
APPLICATION NO. : 12/988795
DATED            : April 9, 2013
INVENTOR(S)      : Jan Nilsson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 352 days.

Signed and Sealed this

First Day of September, 2015

Michelle K. Lee
*Director of the United States Patent and Trademark Office*